(12) United States Patent
Zhang et al.

(10) Patent No.: US 8,817,691 B2
(45) Date of Patent: *Aug. 26, 2014

(54) RESOURCE ALLOCATION FOR OFDMA SYSTEMS WITH HALF-DUPLEX RELAY(S) AND CORRESPONDING TRANSMISSION PROTOCOL

(75) Inventors: Edward Shunqing Zhang, Hong Kong (CN); Vincent Kin Nang Lau, Hong Kong (CN)

(73) Assignee: Lingna Holdings Pte., LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,434

(22) Filed: May 18, 2012

(65) Prior Publication Data
US 2012/0230230 A1 Sep. 13, 2012

Related U.S. Application Data

(63) Continuation of application No. 12/020,781, filed on Jan. 28, 2008, now Pat. No. 8,203,979.

(51) Int. Cl.
*H04B 7/14* (2006.01)
*H04J 1/00* (2006.01)
*H04W 16/26* (2009.01)
*H04W 84/04* (2009.01)

(52) U.S. Cl.
CPC .................................. *H04W 16/26* (2013.01); *H04W 84/047* (2013.01)
USPC ............ 370/315; 370/343; 370/476; 370/492

(58) Field of Classification Search
None
See application file for complete search history.

(56) References Cited

U.S. PATENT DOCUMENTS

| 5,144,622 | A | 9/1992 | Takiyasu et al. |
| 2005/0068911 | A1* | 3/2005 | Miyake et al. ................ 370/299 |
| 2006/0239222 | A1* | 10/2006 | Kim et al. ..................... 370/328 |
| 2008/0049718 | A1* | 2/2008 | Chindapol et al. ............ 370/351 |
| 2008/0144512 | A1* | 6/2008 | Molisch et al. ............... 370/238 |
| 2008/0144562 | A1 | 6/2008 | Draper et al. |
| 2008/0310348 | A1* | 12/2008 | Nandagopalan et al. ..... 370/328 |
| 2009/0109892 | A1* | 4/2009 | Oyman et al. ................. 370/315 |
| 2009/0175214 | A1 | 7/2009 | Sfar et al. |

OTHER PUBLICATIONS

OA dated Jul. 12, 2011 for U.S. Appl. No. 12/020,781, 29 pages.

* cited by examiner

*Primary Examiner* — Christine Duong
(74) *Attorney, Agent, or Firm* — Amin, Turocy & Watson, LLP

(57) ABSTRACT

A transmission protocol is provided for wireless communications in an OFDMA system that uses a rateless code and techniques are provided for dynamically adjusting the subcarrier resources allocated to an OFDMA relay node so that the relay is used at the right time according to the instantaneous channel state information (CSI). As a result, a higher throughput is achieved between source and destination nodes based on a low complexity algorithm for determining when relay assistance is helpful for completing a transmission between the source and destination nodes.

17 Claims, 17 Drawing Sheets

RESOURCE ALLOCATION FOR OFDMA SYSTEMS WITH HALF-DUPLEX RELAY(S) AND CORRESPONDING TRANSMISSION PROTOCOL

CROSS-REFERENCE TO RELATED APPLICATIONS

This application is a continuation of co-pending U.S. patent application Ser. No. 12/020,781, filed on Jan. 28, 2008, entitled "RESOURCE ALLOCATION FOR OFDMA SYSTEMS WITH HALF-DUPLEX RELAY(S) AND CORRESPONDING TRANSMISSION PROTOCOL". The entireties of all prior-filed applications listed herein are hereby incorporated by reference.

TECHNICAL FIELD

The present disclosure relates generally to techniques and a transmission protocol for orthogonal frequency-division multiple-access (OFDMA) wireless communications systems that distribute the transmission of message(s) from a source node to a destination node using one or more half-duplex relay nodes.

BACKGROUND

In the area of wireless communication systems, the notion of using a relay channel for distributing a transmission from a source node to a destination node is a conventional idea, introduced as early as the 1970s; however, due to continued advancements in the capabilities of wireless systems over the decades, the notion has received renewed attention.

In this regard, cooperative communication through relay nodes has been proven to enhance the capacity of the communications channel, and has enabled a new architecture called virtual Multiple Inputs, Multiple Outputs (MIMO) arrays. In addition, data transmission through relay networks in wireless communication systems has been observed to have high spectral efficiency. As a result, for instance, the IEEE 802.11 Task Group and 802.16 Task Group are collaborating with respect to the standardization of certain relay network protocols.

However, there are number of limitations of current architectures for which improvement is generally desired. For instance, some conventionally known relay systems have assumed a full duplex relay. With a full duplex relay, the relay node is assumed to be able to transmit and receive at the same time and on the same channel.

Yet, such a full duplex relay system with perfect echo cancelation proves difficult to implement in practice in real systems. Instead, with real systems, sometimes orthogonal channels are used to isolate the transmitted and received signals at the relay node. Under such circumstances of orthogonal, or independent, transmit and receive channels, the relay node is referred to as a half duplex relay. Such half duplex relays have been considered in the context of frequency division, time division, code division and general orthogonal division. In particular, to exploit the frequency selectivity of broadband wireless systems, orthogonal frequency-division multiple-access (OFDMA) systems have been proposed for half duplex relay networks.

The problem remains, however, as a result of the constraints introduced by a half duplex relay node relative to a full duplex relay node, the use of the half duplex relay node may enhance or degrade the system throughput depending on the instantaneous channel states between the source and relay, the relay and destination as well as the source and destination. This is because when a half duplex relay node is used to transmit the message to the destination, the source node cannot transmit on the same time/frequency slot and therefore, there is overhead, or a cost, associated with using the relay.

As a consequence, if the relay is used at the wrong time, e.g., when the channel state of the relay-destination pair is considerably worse than the channel state of the source-destination pair, there is an observed degradation in the overall system throughput. Hence, the ability to dynamically adjust subcarrier resources allocated to an OFDMA half duplex relay node so that the relay is used only at the right time is desirable.

Conventional approaches that have sought a solution to this problem have dynamically scheduled the usage of the relay node in a centralized manner in which full knowledge of the channel states between any two nodes in the network is required. However, perfect knowledge of the channel states at various nodes is very difficult to obtain in a distributed network. In addition, superposition coding is assumed at the source and relay node, which is not scalable as the number of nodes in the relay networks increases in terms of both the processing complexity and the signaling overhead involved in collecting all the channel state information (CSI) for the nodes. Furthermore, with such conventional approaches, the presence or absence of relays is not transparent to the source node.

Accordingly, there exists a need for improved techniques for OFDMA wireless communications systems to transmit message(s) from a source node to a destination node by scheduling resources to one or more half-duplex relay nodes in an optimal manner.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A transmission protocol is provided for wireless communications in an OFDMA system that uses a rateless code and techniques are provided for dynamically adjusting the subcarrier resources allocated to an OFDMA relay node so that the relay is used at the right time according to the instantaneous channel state information (CSI). As a result, a higher throughput is achieved between source and destination nodes based on a low complexity algorithm for determining when relay assistance is helpful for completing a transmission between the source and destination nodes.

BRIEF DESCRIPTION OF THE DRAWINGS

Various non-limiting embodiments are further described with reference to the accompanying drawings in which.

DETAILED DESCRIPTION

Figure 1:
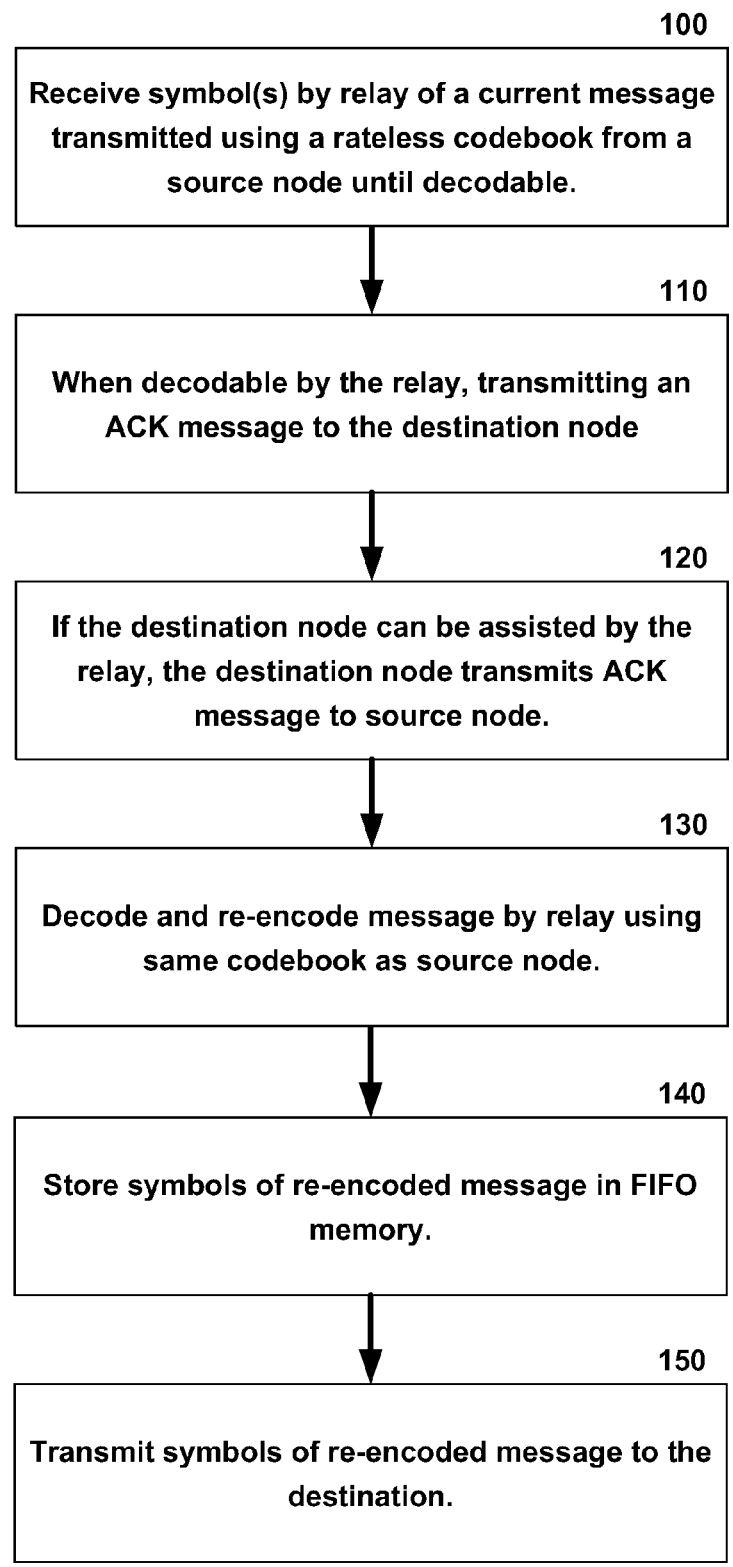
FIG. 1 is a high-level flow diagram illustrating exemplary, non-limiting communications for a relay node in a wireless communications system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

As discussed in the background, more optimal solutions are desired for dynamically allocating subcarrier resources in wireless OFDMA systems with a half duplex relay node, i.e., where the relay node cannot transmit and receive simultaneously on the same frequency. In brief, the use of relay node may enhance or degrade the system throughput depending on the instantaneous channel states between the source and relay, the relay and the destination as well as the source and destination. Hence, various embodiments herein dynamically adjust the resource, i.e., subcarrier, allocated to the relay node so that the relay is used at optimal times according to the instantaneous channel states.

Conventional attempts have dynamically scheduled the usage of the relay node in a centralized manner in which full knowledge of the channel states between any two nodes in the network is required. However, in practice, perfect knowledge of the channel states at various nodes is rarely available and difficult to obtain.

Accordingly, in various embodiments described in more detail below, distributed resource allocation algorithms are provided for OFDMA systems with half-duplex relays by employing a rateless code as part of the transmission protocol. Based on the ACK/NAK exchanges between the source, destination and relay, the proposed algorithm iteratively allocates resources to the source and relay, and converges to a close-to-optimal allocation within a finite number of steps in accordance with a practical tradeoff.

Referring to FIG. 1, a high-level flow diagram of a wireless communication system is illustrated from the perspective of a relay node. At 100, the relay receives symbol(s) of a current message transmitted using a rateless codebook from a source node. At 110, when decodable by the relay, an ACK message is transmitted to the destination node. At 120, if the destination node can be assisted by the relay, the destination node transmits ACK message to source node. At 130, the relay decodes and re-encodes the message using same codebook as source node. At 140, the symbols of re-encoded message are stored in a first in first out stack of the relay. At 150, the relay transmits the symbols of the re-encoded message to the destination.

Figure 2:
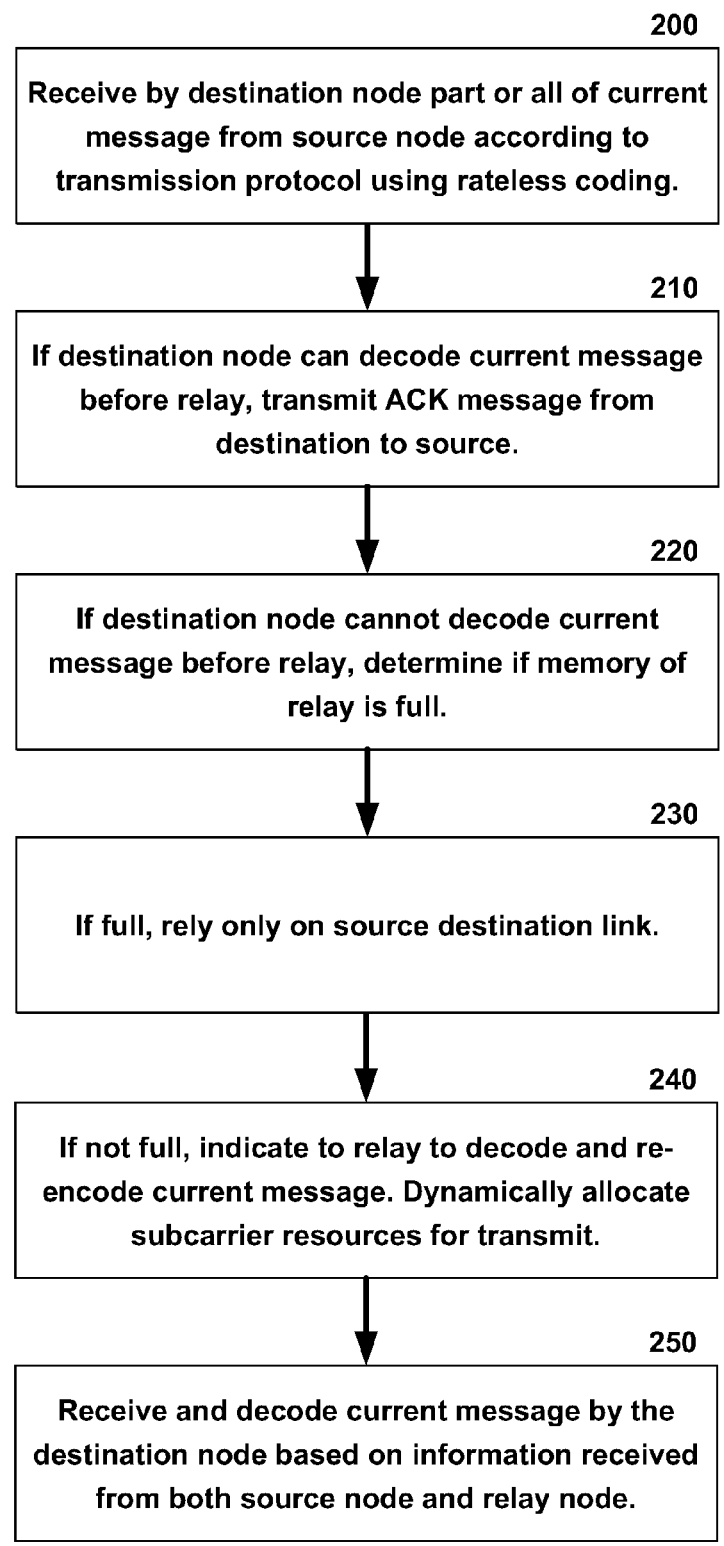
FIG. 2 is a high-level flow diagram illustrating exemplary, non-limiting communications for a destination node in a wireless communications system.

Referring to FIG. 2, a high-level flow diagram of a wireless communication system is illustrated from the perspective of a destination node. At 200, the destination node receives part or all of current message from a source node according to transmission protocol using a rateless code. At 210, if the destination node can decode the current message before the relay, the destination transmits an ACK message to the source node. At 220, if the destination node cannot decode current message before the relay, the destination node determines if the memory stack of the relay is full. If so, at 230, the source destination link is relied upon. At 240, if the memory stack is not full, the destination indicates to the relay node to decode and re-encode the current message, and the destination dynamically allocates subcarrier resources for transmitting to the destination. At 250, the destination receives and decodes the current message as a combination of message information received from both the source node and the relay node.

Advantageously, the resource allocation algorithms performed according the embodiments described herein have low computational complexity compared to brute force alternatives and, as shown below, such allocation of resources has a provable convergence property. Asymptotic throughput performance of the proposed algorithm is also derived in the detailed description below. In this respect, a significant throughput gain is achieved as compared to a point-to-point baseline system without relay as well as compared to a baseline system with relay using random subcarrier allocation.

As mentioned, in one aspect, a distributed resource allocation algorithm is provided for OFDMA systems with half-duplex relay node(s) by employing a rateless code in the transmission protocol. Distributed algorithms described herein include two main parts: (1) the transmission protocol design for the rateless code and (2) the subcarrier allocation algorithm to allocate subcarrier resources to the half duplex relay node. As mentioned, the proposed resource allocation algorithm dynamically adjusts the resource (subcarrier) allocated to the relay node in a distributed manner based on the ACK/NAK exchanges between the source, destination and relay.

Beneficially, embodiments make use of all the locally available information at the destination node without requiring any explicit feedback of CSI information. Based on the locally available information, the algorithm iteratively converges to a close-to-optimal allocation within finite steps, providing performance benefits.

As a roadmap for what follows, some notation is first set forth for general context of description. Next, a relay channel model is described for reference in connection with the described embodiments. The transmission protocol design and the problem formulation with respect to subcarrier selection are then discussed, followed by a variety of embodiments employing the close-to-optimal selection algorithm described herein. Some representative performance considerations are then examined and some empirical results are given that can be compared with other selection algorithms to demonstrate benefits of employing the subcarrier selection techniques.

The following notation conventions are adopted for consistency and clarity herein. Boldface upper case letters denote matrices, boldface lower case letters denote column vectors, and lightface italics denote scalers. $C^{n \times m}$ denotes the set of n×m matrices with complex-valued entries and the superscript denotes $(.)^H$ denotes Hermitian transpose operation. The matrix $I_n$ denotes the n×n identity matrix. Expressions $p_x(X)$ and px denote the probability density function (pdf) of the random variable X. The expectation with respect to X is written as $E_x[\bullet]$ or simply as $E[\bullet]$.

Figure 3:
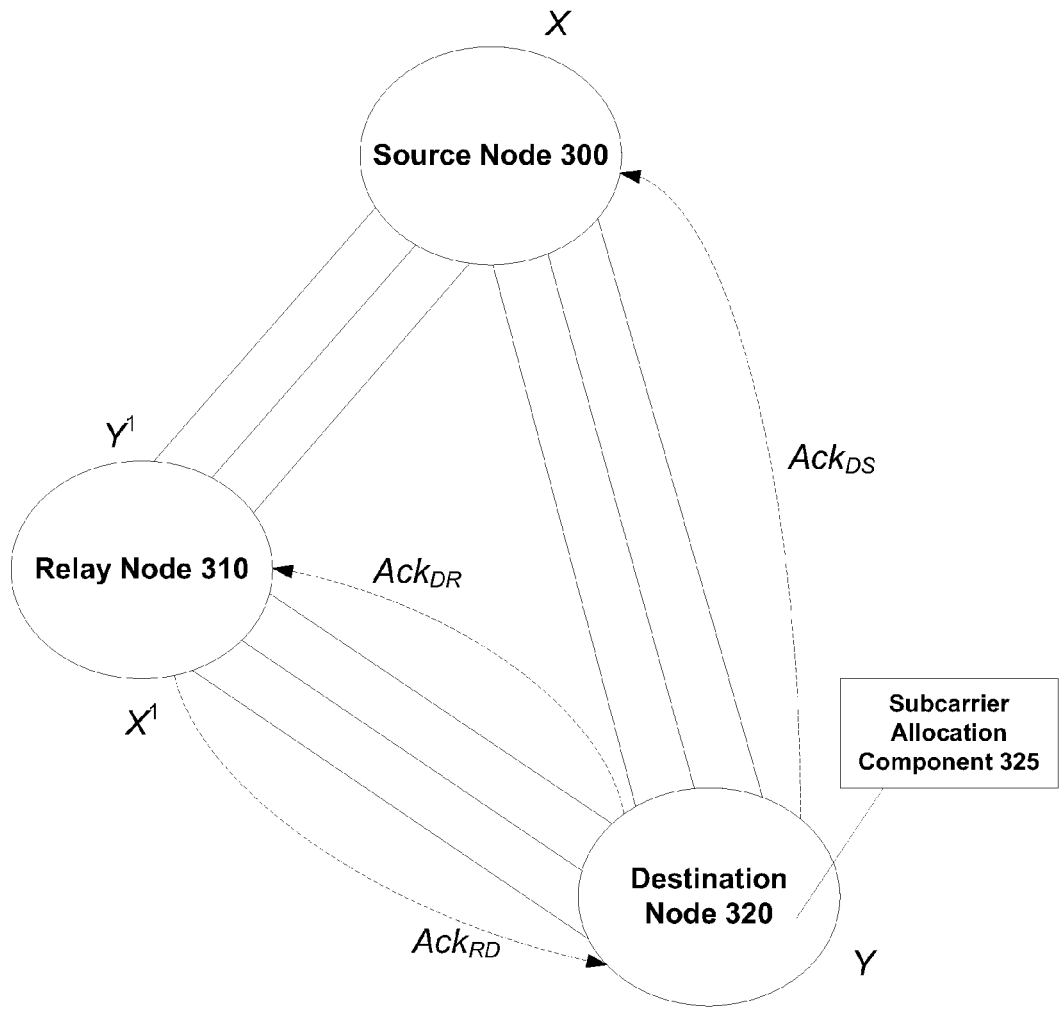
FIG. 3 is a high-level block diagram of a relay channel model for a wireless communication system.

With respect to the relay channel model adopted herein, the OFDMA based half-duplex relay channel model is explained with reference to FIG. 3 illustrating a wideband relay network over frequency selective fading channels with a single source node, relay node and destination node as shown for simplicity in FIG. 3. Each node, including the source 300, the relay 310 and the destination 320, is equipped with a single half-duplex radio and a single antenna (not shown). In the general scenario, the source node 300 wants to communicate to the destination node 320 over a slow fading channel. For example, the relay node 310 can use the Decode-and-Forward (DF) protocol to assist the information transmission between the source node 300 and the destination node 320. As part of the transmission, acknowledgment messages are sent after successful transmission of data. Of note in FIG. 3 are the ACK message from destination node 320 to source node 300, denoted $Ack_{DS}$, the ACK message from destination node 320 to relay node 310, denoted $Ack_{DR}$ and the ACK message from relay node 310 to destination node 320, denoted $Ack_{RD}$.

Let $x \in C^{N \times 1}$ denote the signals transmitted by the source node 300, where N denotes the total number of subcarriers. Signals transmitted by the relay node 310 are denoted by $x^1 \in C^{N \times 1}$. The variances of x and $x^1$ are normalized to unity. Received signals at the relay node 310 and the destination node 320 are denoted by $y^1 \in C^{N \times 1}$ and $y \in C^{N \times 1}$, respectively. The following Equations (1), (2) and (3) show the relationship among those signals:

$$y = H^{SD}Sx + H^{RD}\overline{S}x^1 + z \quad (1)$$

$$y^1 = H^{SR}Sx \quad (2)$$

$$S + \overline{S} = I_N \quad (3)$$

where $H^{SD}, H^{RD}, H^{SR} \in C^{N \times N}$ are diagonal matrices with the $i^{th}$ diagonal elements equal to the fading coefficients of Source-Destination (SD), Relay-Destination (RD), and Source-Relay (SR) channels in the $i^{th}$ subcarrier respectively, and $z \in C^{N \times 1}$ and $z^1 \in C^{N \times 1}$ represent the additive noise with normalized power. S and $\overline{S}$ are the $i^{th}$ diagonal selection matrices. Let $S_A$ and $S_A^C$ denote the set of subcarriers allocated to the source node 300 and the relay node 310 for transmissions, respectively. Then, the $i^{th}$ diagonal element of S equals to 1 when the $i^{th}$ subcarrier is in the set $S_A$ and 0 otherwise. $\overline{S}$ selects the subcarriers for the relay to transmit (denoted as $S_A^C$), and Equation (3) establishes the relationship between S and $\overline{S}$.

The following additional assumptions are made herein for various applicable embodiments. First, the receiver at the relay node 310 is assumed to have perfect CSI knowledge of the SR link only, and the receiver at the destination node 320 is assumed to have perfect CSI knowledge of the SD and RD links, but no CSI knowledge of the SR link. Uniform power allocation is assumed since transmitters have no CSI knowledge of the channels. Secondly, the relay 310 is assumed to be able to transmit and receive on different subcarriers simultaneously, where the transmitted and received signals do not couple together. Furthermore, for each link, the fading coefficients of the subcarrier are assumed to be independent and identically distributed (i.i.d.) complex symmetric random Gaussian variables with zero-mean. It is noted that any of the embodiments herein can be directly used in correlated subcarrier scenarios as well. Slow fading channels are considered where the aggregate CSI $H = (H^{SD}, H^{RD}, H^{SR})$ remains quasi-static within a fading block.

Having set forth the relay model above, a low complexity protocol for the transmission of rateless codes is next introduced, from which the resources allocation problem can be formulated as an integer programming problem, which is then solved below in various embodiments.

Figure 4:
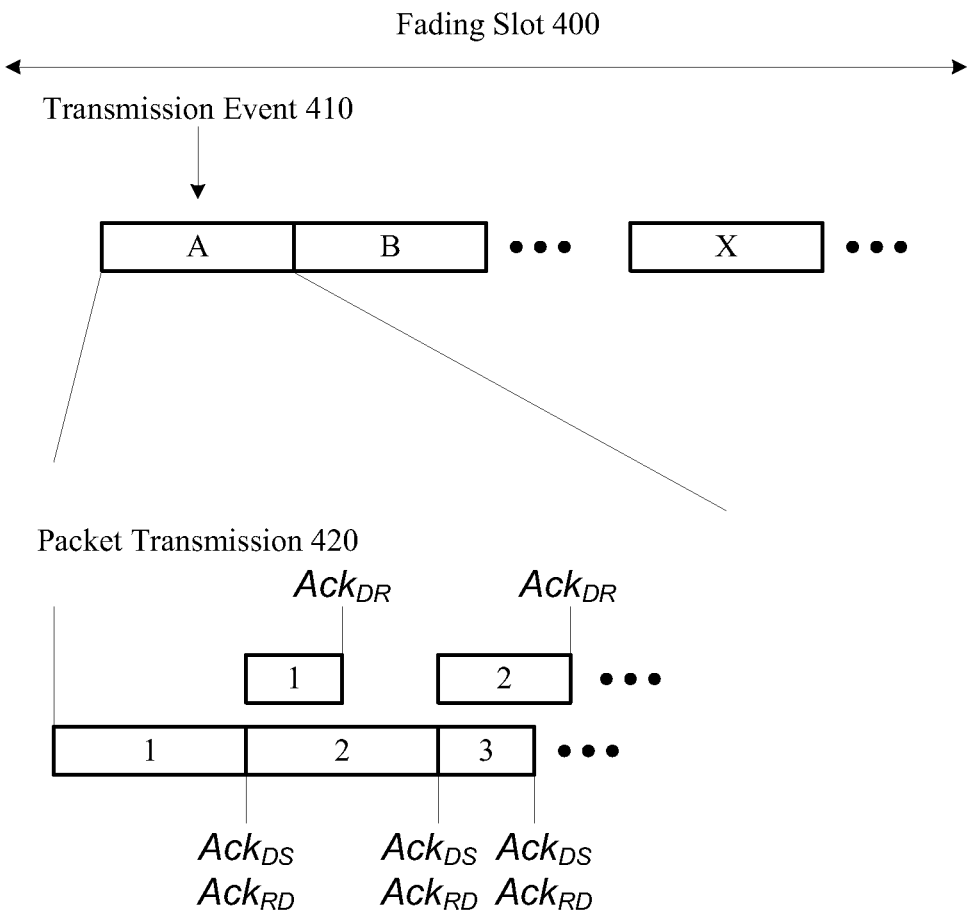
FIG. 4 is a block diagram illustrating relationships among a transmission event, a packet transmission and fading slot.

Thus, in one aspect, embodiments provide a transmission protocol using rateless codes. In this regard, a rateless codebook containing $2^l$ codewords at the transmitter (to deliver l information bits) is considered where each codeword is infinitely long. FIG. 4 generally illustrates the notions of a packet transmission 410, a transmission event 420, and a fading slot 400. For easy illustration, a packet transmission 420 is defined to be the event for the transmitter to successfully deliver one packet (part of the complete codeword) to the receiver. A transmission event 410 is defined to have occurred when the destination node successfully decodes one codeword delivered by the source (and hence, obtained l information bits). A fading slot 400 is defined to be the duration during which the aggregate CSI H remains quasi-static (which may contain multiple transmission events A, B, . . . , X, . . . ). Further, $N_L$ is defined to be the number of transmission events 410 per fading slot 400.

Figure 5:
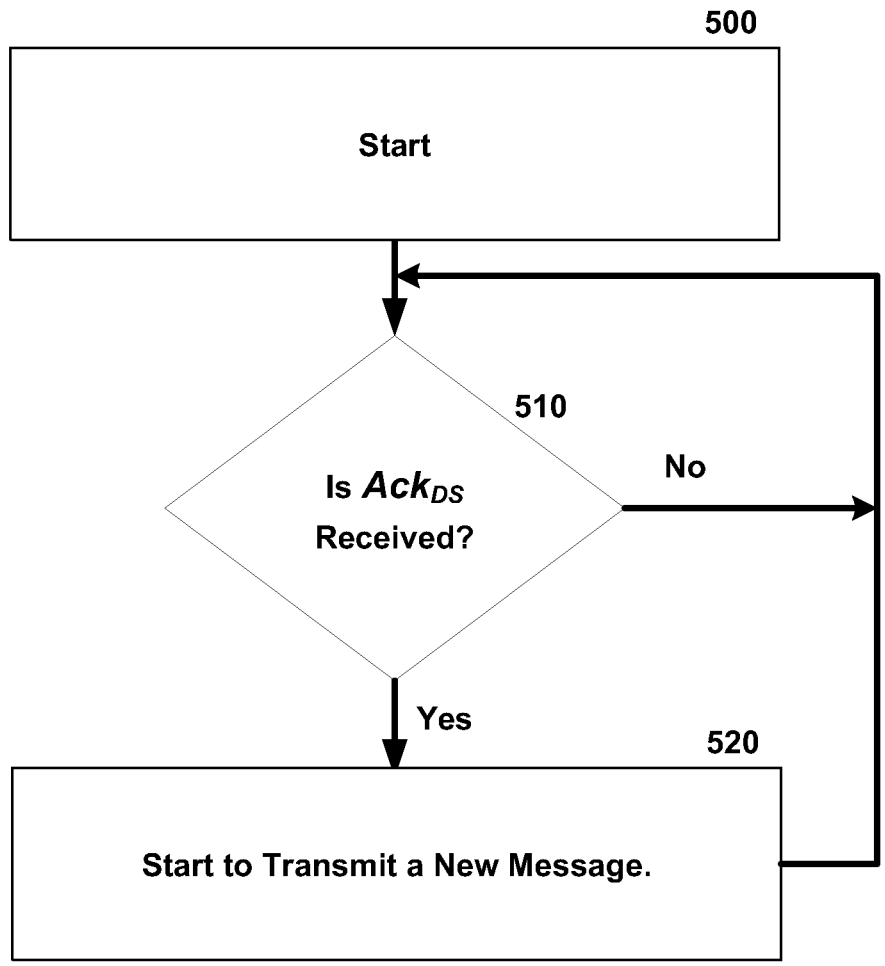
FIG. 5 illustrates exemplary, non-limiting aspects of source communications in accordance with a transmission protocol provided in various embodiments.

By the definition of $S_A$ and $S_A^C$, $S_A \cup S_A^C$ gives the entire subcarriers, $S_T$. To ensure half-duplex operation, the following relation pertains: $S_A \cap S_A^C = \emptyset$. The protocol at the source node can be described with reference to FIG. 5. After start 500, for every transmission event, the encoder at the source selects one of the $2^l$ codewords (with infinite block size) to transmit at 520 based on l information bits over the set of subcarriers $S_A$. The destination node sends an acknowledgement (ACK) to the source node ($Ack_{DS}$) when $1 \leq \sum_{i=0}^{T} I(x_i;$ $y_i|H$) where t is the current packet index in a transmission event. A check for whether $Ack_{DS}$ has been received occurs at 510. If $Ack_{DS}$ has not been received, the source node continuously transmits the encoded symbols (next part of the long codeword) until $Ack_{DS}$ is received eventually.

Figure 6:
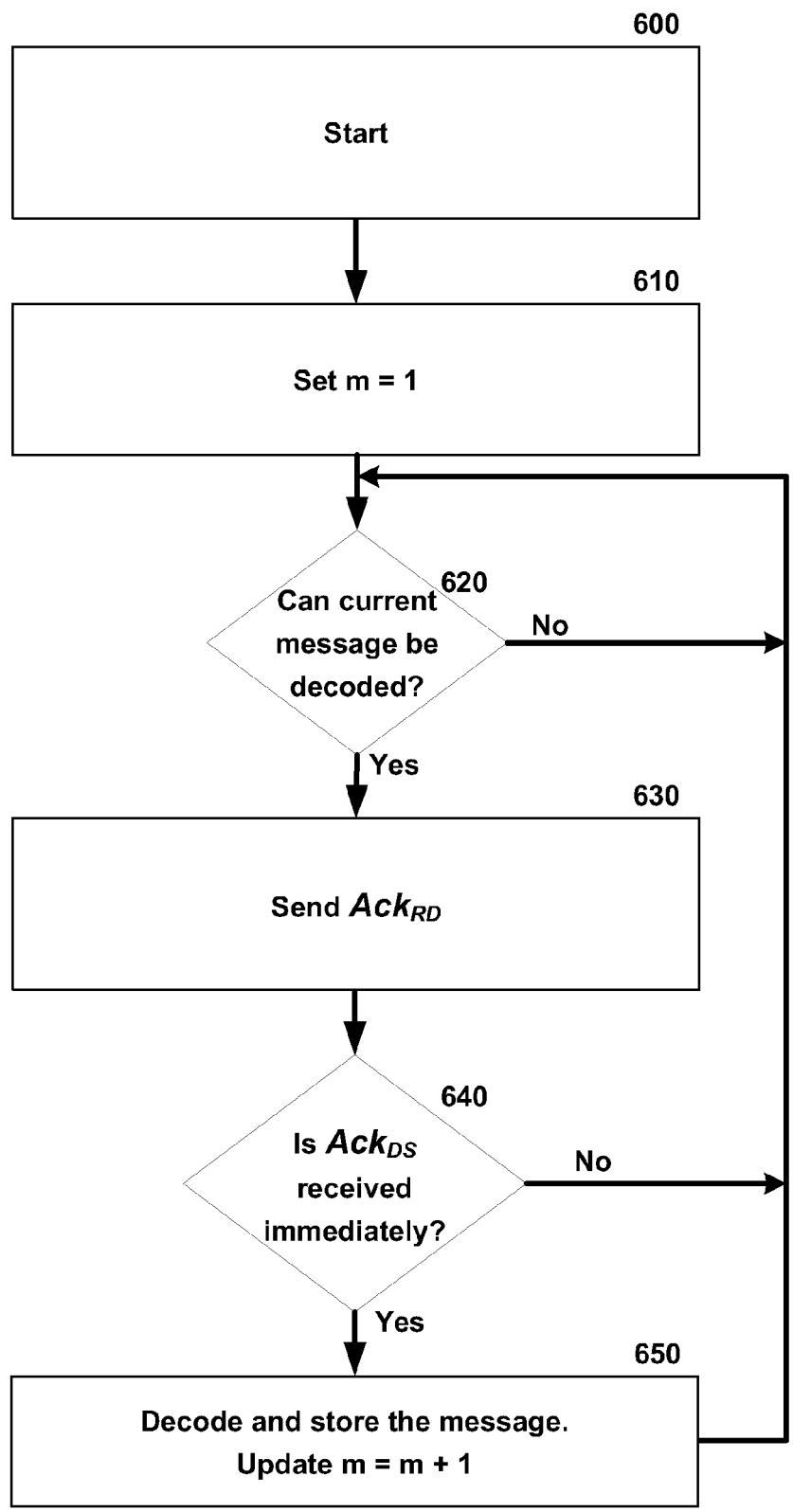
FIGS. 6 and 7 illustrate exemplary, non-limiting aspects of relay communications in accordance with a transmission protocol provided in various embodiments.

The protocol at the relay node can be described with reference to FIGS. 6 and 7. In FIG. 6, after start 600, starting with the first message at 610, the relay node keeps receiving the symbols transmitted by the source over $S_A$ until enough mutual information $1 \leq \Sigma_{i=0}^t I(x_i; y_i^1 | H^{SR}$ has been collected to decode the current message at 620. If so, it sends an acknowledge to the destination $Ack_{RD}$ at 630. If the destination could use help from the relay, at 640, a quick response from the destination is sent immediately as indicated by the acknowledgement $Ack_{DS}$. The relay will then decode and re-encode the decoded message using the same codebook as the source node at 650, and move on to the next message.

Figure 7:
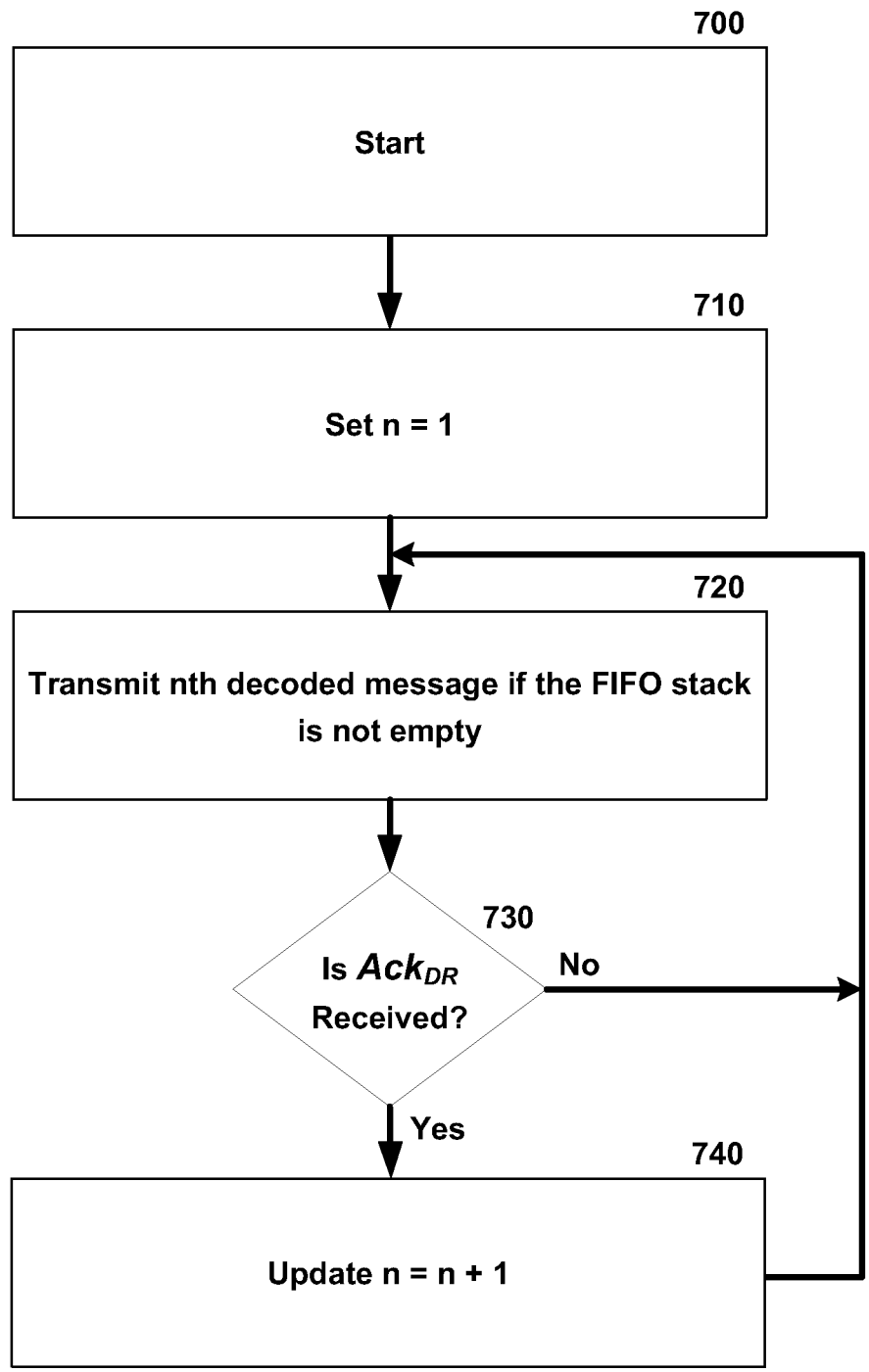

Then, as shown in FIG. 7, after start 700, beginning with the first message at 710, the left-over symbols in the re-encoded codeword are stored in the First-In-First-Out (FIFO) stack of the relay and transmitted at 720 to the destination node over the set of subcarriers $S_A^C$. Since relay and source share the same codebook, the relay knows the symbols transmitted by the source. The relay then continues to transmit symbols right after the last symbol transmitted by the source. The relay transmits the next information message in the FIFO stack at 740 when the acknowledgement from the destination, $Ack_{DR}$, is received at 730.

Figure 8:
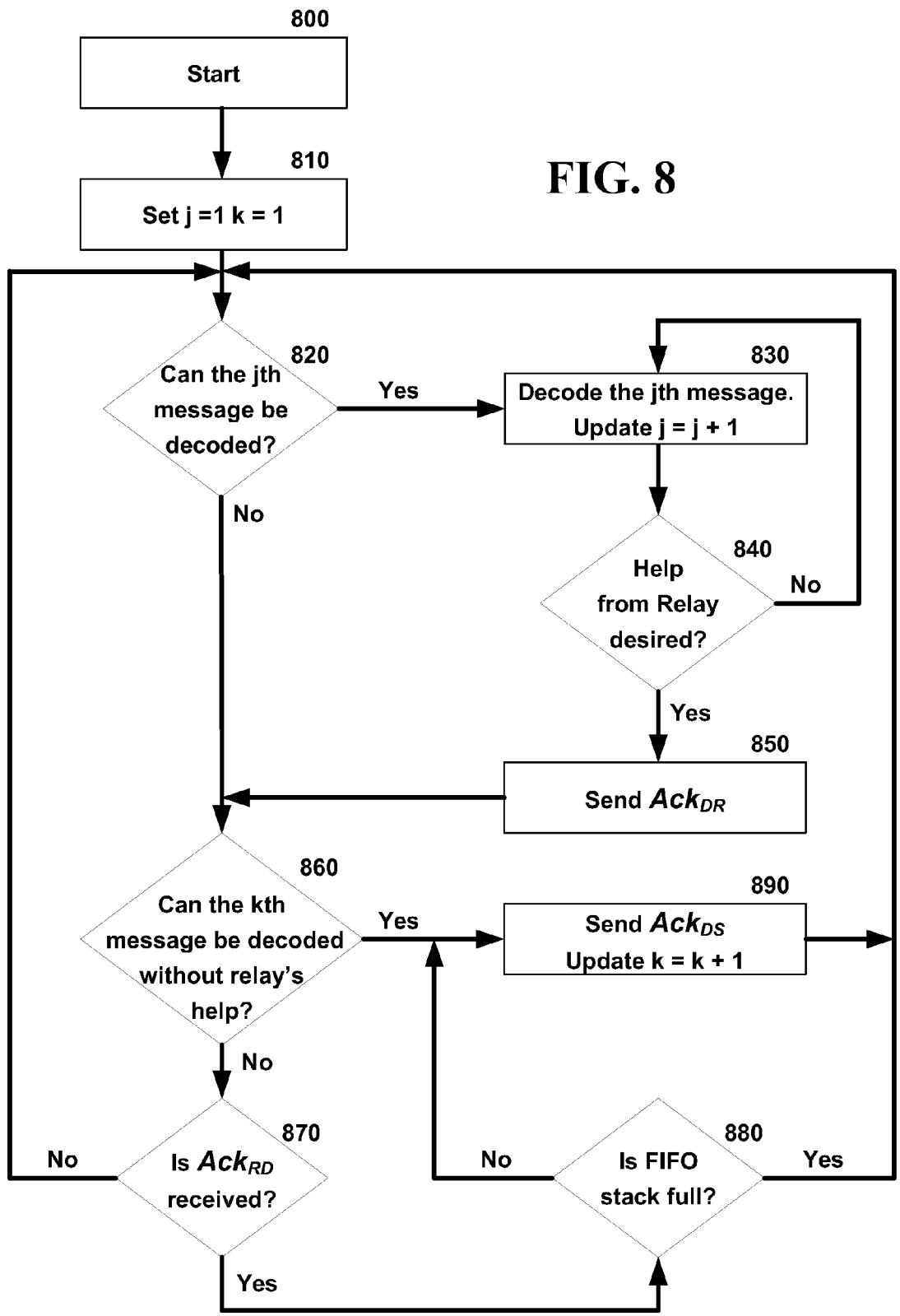
FIG. 8 illustrates exemplary, non-limiting aspects of destination communications in accordance with a transmission protocol provided in various embodiments.

The protocol at the destination node can be described with reference to FIG. 8. After start 800, message counts j and k are set to 1 at 810. If the destination can decode the jth message, at 820, then the jth message is decoded at 830, after which the j message count is incremented for the next message. Next, based on whether help from the relay is desired for decoding at 840, an $Ack_{DR}$ message is transmitted by the destination to the relay at 850.

Next, it is determined whether the kth message can be decoded without the relay's help at 860. The flow also proceeds to 860 if the jth message cannot be decoded at 820. If the kth message can be decoded by the destination without the relay's help, then at 890, an $Ack_{DS}$ message is sent to the source, the k message count is incremented and the flow returns to 820 for the next round of the process for the next messages. If, at 860, the kth message cannot be decoded without the relay's help, then it is determined whether relay has received an $Ack_{RD}$ message has been received from the relay. If not, then the flow returns to 820 for the next round of the process for the current messages for decoding as defined by the j and k message counts.

If, at 870, an $Ack_{RD}$ message has been received by the destination from the relay, then at 880, if the FIFO stack is not full, then the flow proceeds to 890, where an $Ack_{DS}$ message is sent to the source, the k message count is incremented and the flow returns to 820 for the next round of the process for the next messages. If the FIFO stack is full, then the flow proceeds directly to 820.

In this regard, information received the destination node contains two parts. The first part is transmitted by the source over $S_A^C$. As long as the destination node can decode the message before the relay node, $Ack_{DS}$ will be sent (at 890). If it is not the case, i.e., the relay can decode before the destination indicated by $Ack_{RD}$ the destination will determine whether the FIFO stack of the relay node is full. When the relay is transmitting k-th message, and the source is transmitting the j-th message, in one embodiment, the destination determines that the FIFO stack is full when $j-k$ exceeds the size of the FIFO stack d. If it is full, which means no more messages can be stored in the relay, the destination will rely on the SD link to receive the current information and declare an $Ack_{DS}$ message later when the information can be decoded successfully.

Otherwise, the destination will send the $Ack_{DS}$ message immediately to inform the source node to send a new message and at the same time, indicate to the relay node to decode and store the current re-encoded message in the FIFO. The remaining part of the current message is transmitted by the relay node over $S_A$. With the help of the relay node, the destination node can decode the message based on the two parts of received symbols. The first part is transmitted by the source and the second part is the extra information transmitted by the relay. The $Ack_{DR}$ message is produced when the destination has accumulated enough total mutual information from the two parts of received symbols to decode the message.

Figure 9:
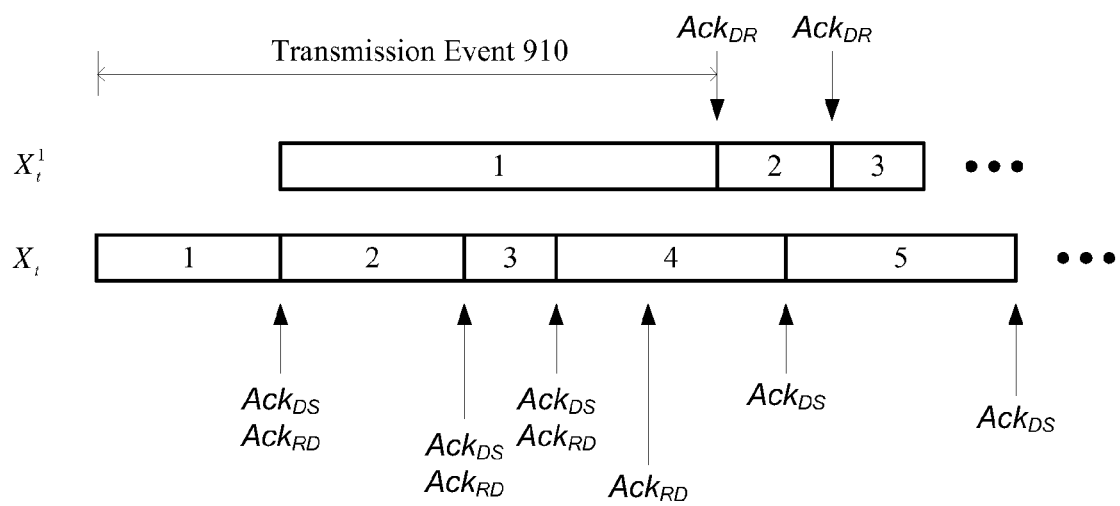
FIGS. 9, 10 and 11 illustrate various examples of operation of the acknowledgment messages sent in connection with different non-limiting messaging scenarios for transmission events.

The following examples show the relation between three acknowledgements (ACKs). For instance, as shown in FIG. 9, a transmission event 910 is shown during a fading slot. The relay node is able to decode the first four packets before the destination can.

For simplicity of example, not limitation on scope, the stack size d at the relay node is assumed equal to 2. Thus, for first three transmission events, the destination node knows that the stack is not full and thus send the $Ack_{DS}$ message immediately after the $Ack_{RD}$ message is received. However, as shown, when the source is transmitting the fourth message, the destination realizes that the stack at the relay node is full since the relay is still transmitting the first message and thus relies on the SD link instead to transmit the current message. For the fifth transmission event, the destination can decode before the relay, and only $Ack_{DS}$ is sent.

For simplicity, the ACKs ($Ack_{RD}$, $Ack_{DS}$ and $Ack_{DR}$) are assumed to be delivered over a noiseless feedback channel between the corresponding nodes. Since the usage of a relay node (increasing the size of $S_A^C$) consumes system resources (decreasing the size of $S_A$), as mentioned, the use of the relay node may contribute to performance gain or loss depending on the current CSI. Hence, in various embodiments described herein, the resources are dynamically adapted in terms of allocation to the relay, $S_A^C$, for optimal performance in a distributed manner without knowing the CSI at the transmitter. In the next section, the relay resource allocation design is re-formulated as an optimization problem.

With respect to the problem formulation for subcarrier selection, since the subcarrier allocation is done at the destination node only, the selection can be a function of the CSIR $H_{SD}$, $H_{RD}$, but not the CSI $H_{SR}$. For notation convenience, the following definition is provided for subcarrier allocation policy.

Definition of Subcarrier Allocation Policy: A subcarrier allocation for the source node S, $S_A(H^{SD}, H^{RD})$, is defined as the set of subcarriers assigned to the source for its transmission which is a function of the CSIR $H^{SD}, H^{RD}$ at the destination node D. The subcarrier allocation policy $S_A = \{S_A(H^{SD}, H^{RD})\}$ is thus the collection of subcarrier allocations under different CSI conditions ($H^{SD}, H^{RD}$).

Theorem I. Given an aggregate CSI $H = (H^{SD}, H^{RD}, H^{SD})$ in a fading block, the instantaneous throughput achievable by the rateless code $R(H, S_A)$ (b/s/Hz) between the S and D is given by Equation (4):

$$R(H, S_A) = \lim_{L \to \infty} \frac{L}{T(H, S_A)} \quad (4)$$

$$= \frac{1}{n_F} \min \left\{ \max \left\{ \begin{array}{l} \sum_{i \in S_A} \log(1 + |h_i^{SR}|^2 SNR), \\ \sum_{i \in S_A} \log(1 + |h_i^{SD}|^2 SNR) \end{array} \right\}, \right.$$

$$\left. \sum_{i \in S_A} \log(1 + |h_i^{SD}|^2 SNR) + \sum_{j \in S_A^C} \log(1 + |h_j^{RD}|^2 SNR) \right\}$$

where L and $T(H, S_A)$ are the number of information bits and the corresponding duration (in number of symbols) in one fading slot and $n^F$ is the total number of subcarriers. A proof of Theorem I is provided in Appendix A.

Hence, the average throughput between S and D (averaged over multiple fading blocks H) is given by Equation (5):

$$\overline{R}(S_A) = E_H[R(H, S_A)]. \quad (5)$$

The optimal subcarrier allocation policy for relay, $S_A^*$ is given by the following optimization problem in Equation (6):

$$S_A^* = \operatorname*{argmax}_{S_A} \overline{R}(S_A) \quad (6)$$

$$= \operatorname*{argmax}_{S_A} E_H \left[ \frac{1}{n_F} \min \left\{ \begin{array}{l} \max \left\{ \begin{array}{l} \sum_{i \in S_A} \log(1 + |h_i^{SR}|^2 SNR), \\ \sum_{i \in S_A} \log(1 + |h_i^{SD}|^2 SNR) \end{array} \right\}, \\ \sum_{i \in S_A} \log(1 + |h_i^{SD}|^2 SNR) + \\ \sum_{j \in S_A^C} \log(1 + |h_j^{RD}|^2 SNR) \end{array} \right\} \right]$$

For notational convenience, $\lambda^T = [\lambda_1, \lambda_2, \ldots, \lambda_{n_F}]$ is defined, where $\lambda_i = 1$ when the i-th subcarrier is in the set $S_A$, and 0 otherwise. Λ is denoted to be the collection of all λ under different channel conditions. The optimization problem can thus be represented as Equation (7):

$$\Lambda^* = \operatorname*{argmax}_{\Lambda} \overline{R}(\Lambda) \quad (7)$$

$$= \operatorname*{argmax}_{\Lambda} E_H \left[ \frac{1}{n_F} \min \left\{ \begin{array}{l} \max\{\lambda^T C^{SR}, \lambda^T C^{SD}\}, \\ \lambda^T C^{SD} + (1-\lambda)^T C^{RD} \end{array} \right\} \right]$$

where $C^{SR} = [C_1^{SR}, \ldots, C_{n_F}^{SR}]$, $C^{SD} = [C_1^{SD}, \ldots, C_{n_F}^{SD}]$, $C^{RD} = [C_1^{RD}, \ldots, C_{n_F}^{RD}]$ respectively, with $C_i^A = \log(1 + |h_i^A|^2 SNR)$ and 1 stands for the $n_F \times 1$ all-one vector.

Solving the above optimization problem of Equation (7) can be non trivial because the subcarrier allocation $\lambda(H^{SD}, H^{RD})$ cannot be a function of the CSI $H^{SR}$ because, as mentioned, the CSI $H^{SR}$ is not available at the destination node. Accordingly, below, subcarrier allocation solutions are considered for two cases, namely small $N_L$ and large $N_L$, in which knowledge is based on $H^{SD}$ and $H^{RD}$.

In further regard to the subcarrier selection policy, the optimal subcarrier selection policy can be found based on solving the optimization problem given by Equation (7). For ease of illustration, two cases are set forth below according to the number of transmission events during a fading slot.

First, with respect to subcarrier selection policy for small $N_L$, the number of transmission events during a quasi-static fading slot is limited and the destination cannot estimate the CSI of the SR link based on the previous transmission. To utilize the knowledge of $H^{SD}$ and $H^{RD}$ let $$h(\lambda) = E_{H^{SR}}[\min\{\max\{\lambda^T C^{SR}, \lambda^T C^{SD}\}, \lambda^T C^{SD} + (1-\lambda)^T C^{RD}\}].$$

The optimization problem of Equation (7) is then equivalent to:

$$\operatorname*{argmax}_{\lambda} h(\lambda, H^{SD}, H^{RD}) \quad (8)$$

$$\text{s.t. } \lambda_i \in \{0, 1\}, \forall i$$

Lemma 1: $h(\lambda, H^{SD}, H^{RD})$ can be expressed as:

$$h(\lambda, H^{SD}, H^{RD}) = \quad (9)$$

$$\lambda^T C^{SD} \int_0^{\lambda^T C^{SD}} p_y(y) dy + \int_{\lambda^T C^{SD}}^{\lambda^T C^{SD} + (1-\lambda)^T C^{RD}} y p_y(y) dy +$$

$$\lambda^T C^{SD} + (1-\lambda)^T C^{RD} \int_{\lambda^T C^{SD} + (1-\lambda)^T C^{RD}}^{\infty} p_y(y) dy$$

Where $y = \lambda^T C^{SR}$ and $p_y(y)$ denote the p.d.f. of the random variable y. A proof of Lemma 1 can be found in Appendix B below.

Applying Lemma 1, the first and the second derivative of $h(\lambda)$ are taken with respect to $\lambda_i$, obtaining Equations (10) and (11) as follows:

$$\frac{dh(\lambda, H^{SD}, H^{RD})}{d\lambda_i} = \quad (10)$$

$$C_i^{SD} \int_0^{\lambda^T C^{SD}} p_y(y) dy + (C_i^{SD} - C_i^{RD}) \int_{\lambda^T C^{SD} + (1-\lambda)^T C^{RD}}^{\infty} p_y(y) dy$$

$$\frac{d^2 h(\lambda, H^{SD}, H^{RD})}{d\lambda_i^2} = \quad (11)$$

$$C_i^{SD2} p_y(\lambda^T C^{SD}) - (C_i^{SD} - C_i^{RD})^2 p_y(\lambda^T C^{SD} + (1-\lambda)^T C^{RD})$$

If $C_i^{SD} - C_i^{RD} \geq 0$, then $h(\lambda)$ is a strictly increasing function with respect to $\lambda_i$, since $dh(\lambda)/d\lambda_i > 0$. As a result, the optimal choice of is $\lambda_i$ is $\lambda_i^{\text{a}} = 1$. The physical interpretation is when the channel condition of SD link is stronger than RD link, the best strategy is to allocate the resource (i-th subcarrier) for the source to transmit.

On the other hand, if $C_i^{SD} - C_i^{RD} < 0$, then $h(\lambda)$ is a monotonic function in $\lambda_i$. The optimal solution $\lambda^{\text{a}}$ is given by the following iterative algorithm (e.g., by gradient method) of Equations (12) and (13):

$$\lambda_i^{(n+1)} = \left[ \lambda_i^{(n)} + \epsilon_i^{(n)} \frac{dh(\lambda)}{d\lambda_i} \right]^P \text{ when } \frac{d^2 h(\lambda)}{d\lambda_i^2} < 0 \quad (12)$$

$$\lambda_i^{(n+1)} = \left[ \lambda_i^{(n)} - \epsilon_i^{(n)} \frac{dh(\lambda)}{d\lambda_i} \right]^P \text{ when } \frac{d^2 h(\lambda)}{d\lambda_i^2} \geq 0 \quad (13)$$

where n is the iteration number, $\epsilon_i^{(n)}$ is a positive parameter to regulate the step size of iterations and $[\cdot]^P$ is defined as the projection operation to map $\lambda_i$ into the real value between 0 and 1.

With respect to subcarrier selection policy for large $N_L$ (meaning that there are sufficiently large transmission events within a quasi-static fading block). Let $$g(\lambda) = \min\{\max\{\lambda^T C^{SR}, \lambda^T C^{SD}\}, \lambda^T C^{SD} + (1-\lambda)^T C^{RD}\}.$$

$g(\lambda)$ can be evaluated under the following three conditions.

Case 1: D can decode the packet (sending out $Ack_{DS}$) before R does. In this case, we have $\lambda^T C^{SR} \leq \lambda^T C^{SD}$ and hence, the optimization objective in Equation (7) can be reduced to Equation (14):

$$g(\lambda) = \lambda C^{SD} \tag{14}$$

Case 2a: R can decode the packet (sending out $Ack_{RD}$) before D does and $$\lambda^T C^{SR} \leq \lambda^T C^{SD} + (1-\lambda)^T C^{RD}.$$

In this case, the optimization objective in Equation (7) becomes Equation (15):

$$g(\lambda) = \lambda^T C^{SR} \tag{15}$$

Case 2b: R can decode the packet (sending out $Ack_{RD}$) before D does and $$\lambda^T C^{SR} > \lambda^T C^{SD} + (1-\lambda)^T C^{RD}.$$

In this case, the simplified optimization objective in Equation (7) is given by Equation (16):

$$g(\lambda) = \lambda^T C^{SD} + (1-\lambda)^T C^{RD} \tag{16}$$

Hence, combining Equations (14), (15) and (16), the optimization objection $g(\lambda)$ can be expressed as Equation (17):

$$\operatorname*{argmax}_{\lambda} g(\lambda) = \begin{cases} \lambda^T C^{SD}, & \text{for Case 1} \\ \lambda^T C^{SR}, & \text{for Case 2a} \\ \lambda^T (C^{SD} - C^{RD}) + 1^T C^{RD}, & \text{for Case 2b} \end{cases} \tag{17}$$

$$\text{s.t. } \lambda_i \in \{0, 1\}, \forall i$$

Problem (17) is an integer programming problem, since the optimization variables $\lambda$ are restricted to integers. An optimal solution of the combinatorial optimization problem is in general an NP-hard problem. In order to reduce the complexity, first the integer variables $\lambda$ in (17) are relaxed to real variables.

The optimization objective function $g(\lambda)$ is piece-wise linear in $\lambda$, and thus a continuous convex function of $\lambda$ (but not differentiable). As a result, traditional gradient-type search cannot always be applied here. Nevertheless, it is possible to find a search direction based on what is known as a subgradient. Define the subgradient of a function as:

As defined herein, a vector f is a subgradient of $g(\lambda)$ at $\lambda$, if for all $\lambda'$, $$g(\lambda') \geq g(\lambda) + f^T(\lambda' - \lambda) \tag{18}$$

The term subgradient is a generalization of gradient for non-differentiable functions. Intuitively speaking, f is a subgradient if the linear function with slope f passing through $(\lambda, g(\lambda))$ lies entirely below $g(\lambda)$. The subgradient of the optimization objective $g(\lambda)$ with respect to $\lambda$ is given by the following lemma.

Lemma 2. The subgradient for the function $g(\lambda)$ with respect to $\lambda$ is:

$$f = \begin{cases} C^{SD}, & \text{for Case 1} \\ C^{SR}, & \text{for Case 2a} \\ C^{SD} - C^{RD}, & \text{for Case 2b} \end{cases} \tag{19}$$

A proof of Lemma 2 is given in Appendix C below.

Applying Lemma 2, the iterative algorithm for the optimization problem (17) based on a subgradient method is given below in Equation (20):

$$\lambda^{(n+1)} = [\lambda^{(n)} + \alpha^{(n)} f^{(n)}]^Q \tag{20}$$

where n is the iteration number, $\alpha^{(n)}$ is a sequence of scalar step-sizes, $[\cdot]^Q$ is defined as the projection operation to map the variable $\lambda$ into the feasible set, given by $0° \lambda° 1$ and $f^{(n)}$ is the subgradient direction for the n-th iteration. The above subgradient method is guaranteed to converge to the optimal $\lambda$ as long as $\alpha^{(n)}$ is chosen to be sufficiently small. To choose the step-size, a non-limiting criterion that can be used is that $\alpha^{(n)}$ must be square summable, but not absolute summable. Since the norm of f is bounded above, the following choice is made:

$$\alpha^{(n)} = \frac{\beta}{n}$$

for some constant $\beta$ is guaranteed to converge to the optimal $g(\lambda^{\text{å}})$.

Figure 10:
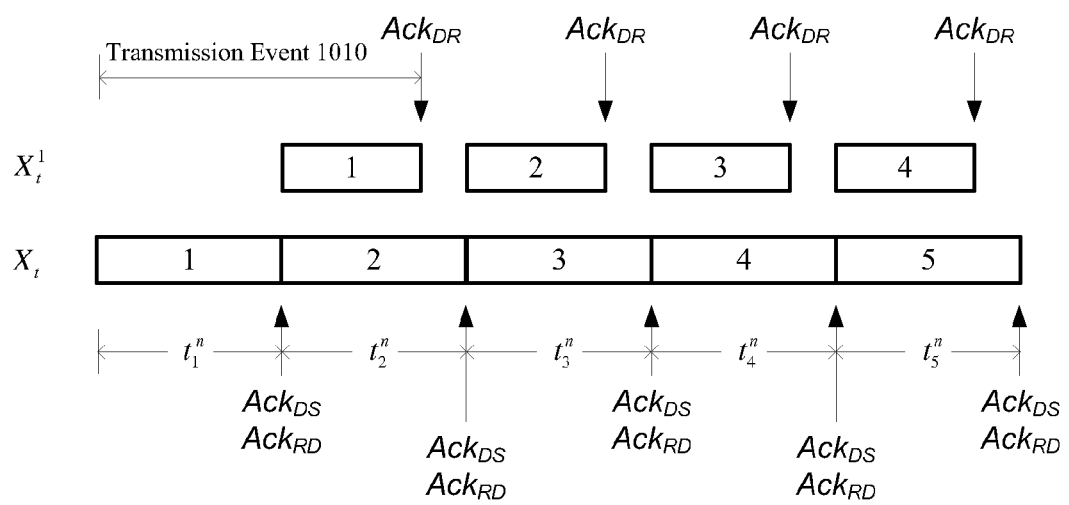
Figure 11:
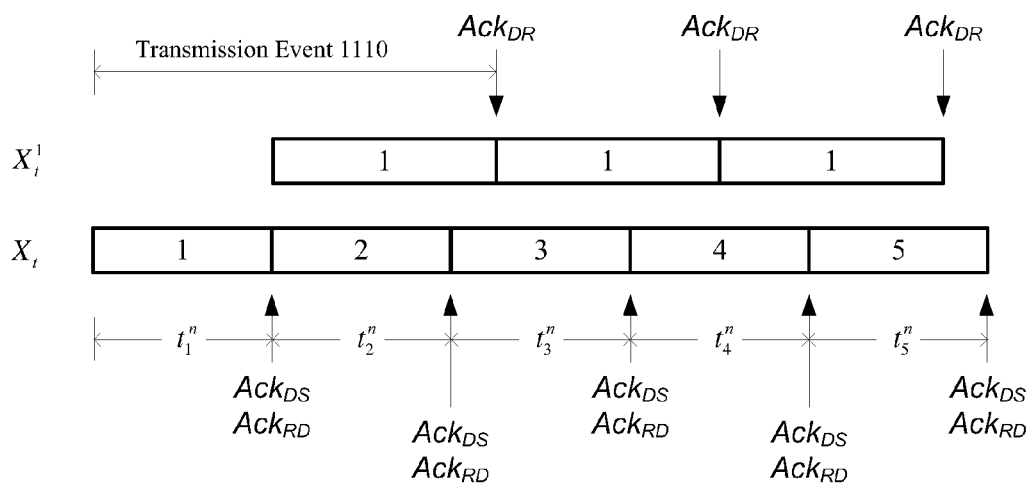

However, $C^{SR}$ is not available at the destination node and hence, the subgradient cannot be computed at the destination node when case 2a happens. To get around this problem, $$t(H, \lambda) = \frac{l}{\lambda^T C^{SR}}$$

is defined to be the time for the source to transmit one codeword (l bits) successfully to the relay with the instantaneous channel realization H and the subcarrier allocation policy $\lambda$. In fact, the destination node could measure this parameter by measuring the time difference between acknowledgements as shown in FIG. 10 and FIG. 11 with transmission events 1010 and 1110, respectively. Without loss of generality, in the first n−1 transmission events, the destination is assumed able to measure $t(H,\lambda^{(1)})$, $t(H,\lambda^{(2)})$, ..., $t(H,\lambda^{(n-1)})$. It is noted that $C^{SR}$ and $t(H,\lambda)$ are related by Equation (21):

$$\begin{bmatrix} \lambda^{(1)} \\ \lambda^{(2)} \\ \cdots \\ \lambda^{(n-1)} \end{bmatrix} C^{SR} = \begin{bmatrix} \frac{l}{t(H, \lambda^{(1)})} \\ \frac{l}{t(H, \lambda^{(2)})} \\ \cdots \\ \frac{l}{t(H, \lambda^{(n-1)})} \end{bmatrix}, \tag{21}$$

As a result, during the n-th iteration, the unknown parameter $C^{SR}$ can be estimated from $\{t(H,\lambda^{(1)}), t(H,\lambda^{(2)}), \ldots, t(H,\lambda^{(n-1)})\}$ with $\hat{C}^{SR}$ given by Equation (22):

$$\hat{C}^{SR} = \begin{bmatrix} \lambda^{(1)} \\ \lambda^{(2)} \\ \cdots \\ \lambda^{(n-1)} \end{bmatrix}^{\dagger} \begin{bmatrix} \frac{l}{t(H, \lambda^{(1)})} \\ \frac{l}{t(H, \lambda^{(2)})} \\ \cdots \\ \frac{l}{t(H, \lambda^{(n-1)})} \end{bmatrix} \tag{22}$$

where $[\cdot]^{\dagger}$ denotes the pseudo-inverse operation of the matrix. Based on Equation (22), the subgradient could be computed for the n-th step and the subcarrier allocation $\lambda^{(n)}$ can be updated. It is noted that since each iteration requires new observations $\{t(H,\lambda^{(1)}), t(H,\lambda^{(2)}), \ldots, t(H,\lambda^{(n-1)})\}$, the solution implicates large $N_L$.

Finally, the above analysis considers the cases when $\lambda$ can be relaxed to the real values. If $\lambda$ is restricted to integers (or in other words, if time-sharing is not allowed over the subcarriers), an extra procedure can be used to round the updated $\lambda^{(n+1)}$ to integers.

With respect to an asymptotic performance analysis of the results of the above protocol and selection policy, the asymptotic average throughput can be derived between S and D ($\overline{R}(S^*_A)$) using the optimal subcarrier selection policy $S^*_A$ based on renewal process. Let the multiple transmission events in the k-th fading slot be a process event. Then, define $T_k(H_k, S_A)$ to be the lifetime of the k-th event in the renewal process and define K to be the number of events. This results in we have $$\overline{R}(S^*_A) = E_H[R(H, S^*_A)] = \frac{1}{n_F} \lim_{K \to \infty} \frac{KL}{\sum_{k=1}^{K} T_k(H_k, S^*_A)}$$

Also, it is known that $$\lim_{K \to \infty} \frac{KL}{\sum_{k=1}^{K} T_k(H_k, S^*_A)} = \frac{L}{\mu}$$

where $\mu = E_H[T(H, S^*_A)]$ is the expected time to transmit L bits averaged over multiple fading blocks. Substituting Equation (4) into the expression, Equation (24) results:

$$E[T(H, S^*_A)] = LE\left[\left(\min\left\{\max\left\{\begin{array}{l}\sum_{i \in S^*_A} \log(1 + |h_i^{SR}|^2 SNR), \\ \sum_{i \in S^*_A} \log(1 + |h_i^{SD}|^2 SNR)\end{array}\right\}^*, \\ \sum_{i \in S^*_A} \log(1 + |h_i^{SD}|^2 SNR) + \\ \sum_{j \in S^{C,*}_A} \log(1 + |h_j^{RD}|^2 SNR)\end{array}\right\}\right)^{-1}\right] \quad (23)$$

In general, Equation (23) is difficult to obtain in closed form since the subcarrier set $S^*_A$ depends on the relations of three random vectors. For simplicity, the signal strength of the SR, RD, and SD links are assumed to have the following relationships $\sigma_{SR}^2 = \sigma_{RD}^2 \ \sigma_{SD}^2$. In such scenario, the communication system mainly relies on the SR and RD links to transmit the information and the expectation of Equation (24) can be simplified as Equation (24):

$$LE\left[\left(\min\left\{\max\left\{\begin{array}{l}\sum_{i \in S^*_A} \log(1 + |h_i^{SR}|^2 SNR), \\ \sum_{i \in S^*_A} \log(1 + |h_i^{SD}|^2 SNR)\end{array}\right\}^*, \\ \sum_{i \in S^*_A} \log(1 + |h_i^{SD}|^2 SNR) + \\ \sum_{j \in S^{C,*}_A} \log(1 + |h_j^{RD}|^2 SNR)\end{array}\right\}\right)^{-1}\right] \geq \quad (24)$$

$$LE\left[\left(\min\left\{\sum_{i \in S^*_A} \log(1 + |h_i^{SR}|^2 SNR), \sum_{j \in S^{C,*}_A} \log(1 + |h_j^{RD}|^2 SNR)\right\}\right)^{-1}\right] =$$

-continued $$LE\left[\max\left\{\frac{1}{\sum_{i \in S^*_A} \log(1 + |h_i^{SR}|^2 SNR)}, \frac{1}{\sum_{j \in S^{C,*}_A} \log(1 + |h_j^{RD}|^2 SNR)}\right\}\right] >$$

$$LE\left[\frac{1}{\sum_{i \in S^*_A} \log(1 + |h_i^{SR}|^2 SNR) + \sum_{j \in S^{C,*}_A} \log(1 + |h_j^{RD}|^2 SNR)}\right]$$

Based on the assumption $\sigma_{SR}^2 = \sigma_{RD}^2 \ \sigma_{SD}^2$, the optimal subcarrier allocation policy $S^*_A$ will be choosing the i-th subcarrier for the source to transmit if $|h_i^{SR}|^2 \geq |h_i^{RD}|^2$. Otherwise, the i-th subcarrier for the relay is chosen to transmit. The expectation in Equation (24) can now be calculated as Equation (25):

$$E\left[\frac{1}{\sum_{i \in S^*_A} \log(1 + |h_i^{SR}|^2 SNR) + \sum_{j \in S^{C,*}_A} \log(1 + |h_j^{RD}|^2 SNR)}\right] = \quad (25)$$

$$\frac{1}{n_F}\left\{E\left[\frac{1}{\log(1 + |h_i^{SR}|^2 SNR)}\Big||h_i^{SR}|^2 \geq |h_i^{RD}|^2\right]P(|h_i^{SR}|^2 \geq |h_i^{RD}|^2) + \right.$$

$$\left. E\left[\frac{1}{\log(1 + |h_i^{RD}|^2 SNR)}\Big||h_i^{SR}|^2 < |h_i^{RD}|^2\right]P(|h_i^{SR}|^2 < |h_i^{RD}|^2)\right\} =$$

$$\frac{1}{n_F}\int_0^\infty \int_\beta^\infty \frac{1}{\log(1+\alpha SNR)} \frac{1}{\sigma_{SR}^2} e^{-\frac{\alpha}{\sigma_{SR}^2}} d\alpha \frac{1}{\sigma_{RD}^2} e^{-\frac{\beta}{\sigma_{RD}^2}} d\beta =$$

$$\frac{1}{n_F}\Psi(\sigma_{SR}^2, \sigma_{RD}^2)$$

The second equality in (25) holds because $\sigma_{SR}^2 = \sigma_{RD}^2$.

Combining Equations (23), (24) and (25), the average throughput between S and D, $\overline{R}(S^*_A)$, is upper-bounded by Equation (26):

$$\overline{R}(S^*_A) = \frac{1}{n_F} \frac{L}{E[T(H, S^*_A)]} < (\Psi(\sigma_{SR}^2, \sigma_{RD}^2))^{-1} \quad (26)$$

To find the lower-bound, $S_A$ is chosen to be the entire set of all the subcarriers $S_T$:

$$E[T(H, S_T)] = LE\left[\frac{1}{\sum_{i \in S_T} \log(1 + |h_i^{SD}|^2 SNR)}\right] \quad (27)$$

$$= \frac{L}{n_F} \int_0^\infty \log(1 + \gamma SNR) \frac{1}{\sigma_{SD}^2} e^{-\frac{\gamma}{\sigma_{SD}^2}} d\gamma$$

$$= \frac{L}{n_F} \Omega(\sigma_{SD}^2)$$

and $\overline{R}(S^*_A)$ is lower-bounded by $$\overline{R}(S^*_A) \geq \frac{1}{n_F} \frac{L}{E[T(H, S)]} = (\Omega(\sigma_{SD}^2))^{-1} \quad (28)$$

Defining the gain of the system throughput G to be the ratio of the throughput using relay $\overline{R}(S^*_A)$ and the through put without using relay $\overline{R}(S)$ or equivalently $G = \overline{R}(S^*_A)/\overline{R}(S)$.

Combining Equations (26) and (28), the upper bound and lower bound of the system throughput and corresponding gain of the system G are summarized as follows:

$$\overline{R}(S^*_A) \geq (\Omega(\sigma_{SD}^2))^{-1}$$

$$\overline{R}(S^*_A) < (\Psi(\sigma_{SR}^2, \sigma_{RD}^2))^{-1}$$

$$1 \leq G \leq \Omega(\sigma_{SD}^2)/\Psi(\sigma_{SR}^2, \sigma_{RD}^2)$$

In the high SNR regime, $\log(1+x\text{SNR}) \approx \log x\text{SNR}$, both the upper bound and lower bound scale with the order of O(log SNR) and as a result, the average throughput $\overline{R}(S^*_A)$ scales with the order of O(log SNR) and the maximum gain with the help of relay $\overline{G}_{high} = \lim_{SNR \to \infty} \Omega(\sigma_{SD}^2)/\Psi(\sigma_{SR}^2, \sigma_{RD}^2)$, thus:

$$\overline{G}_{high} = 1$$

In the low SNR regime, $\log(1+x\text{SNR}) \approx x\text{SNR}$, and the upper bound and low bound scale with a factor of O(SNR) and the maximum gain $\overline{G}_{low} = \lim_{SNR \to 0} \Omega(\sigma_{SD}^2)/\Psi(\sigma_{SR}^2, \sigma_{RD}^2)$, thus:

$$\overline{G}_{low} = \sigma_{SD}^2 \sigma_{RD}^2 \sigma_{SR}^2/\Theta(\sigma_{SR}^2, \sigma_{RD}^2)$$

where $$\Theta(\sigma_{SR}^2, \sigma_{RD}^2) = \int_0^\infty \int_\beta^\infty \alpha^{-1} e^{-\frac{\alpha}{\sigma_{SR}^2} - \frac{\beta}{\sigma_{RD}^2}} d\alpha d\beta.$$

Figure 12:
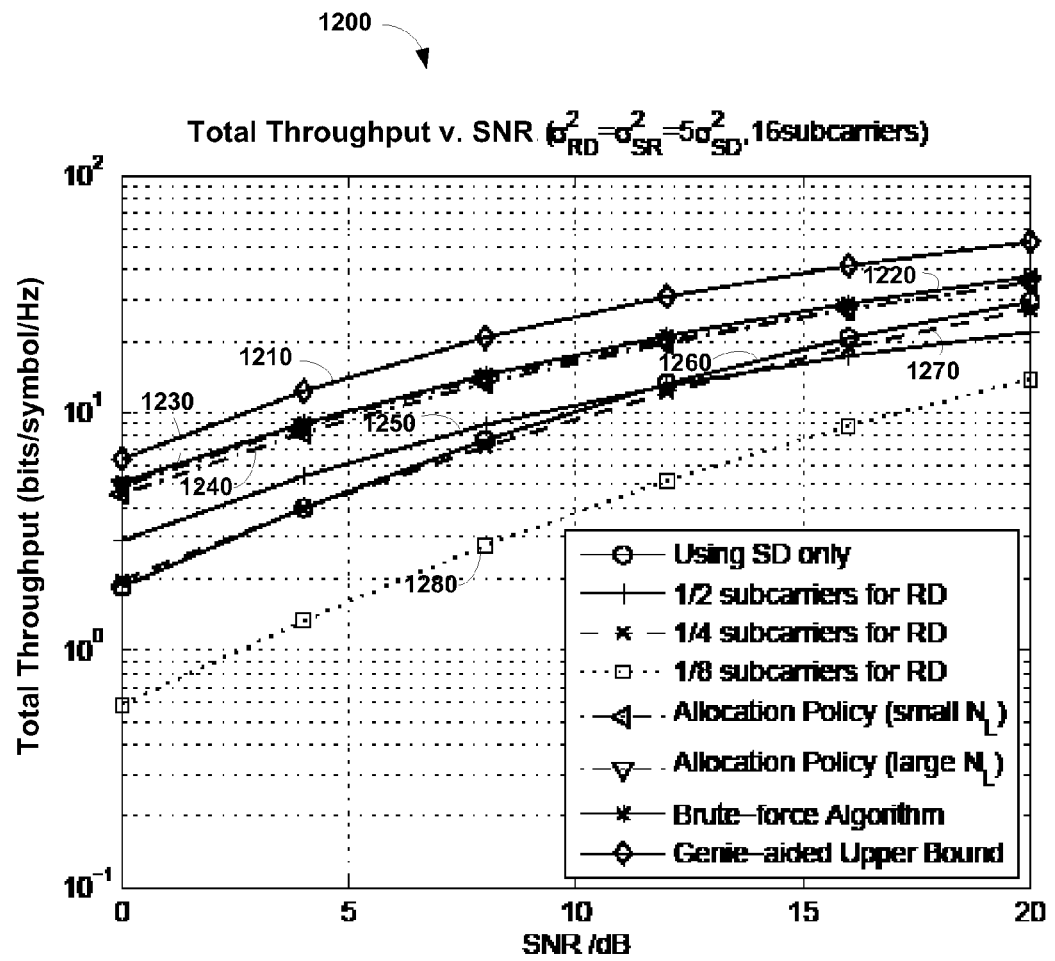
FIGS. 12, 13, 14 and 15 illustrate performance benefits in terms of throughput from the source to destination in accordance with a half-duplex relay communicating according to the various embodiments.
Figure 13:
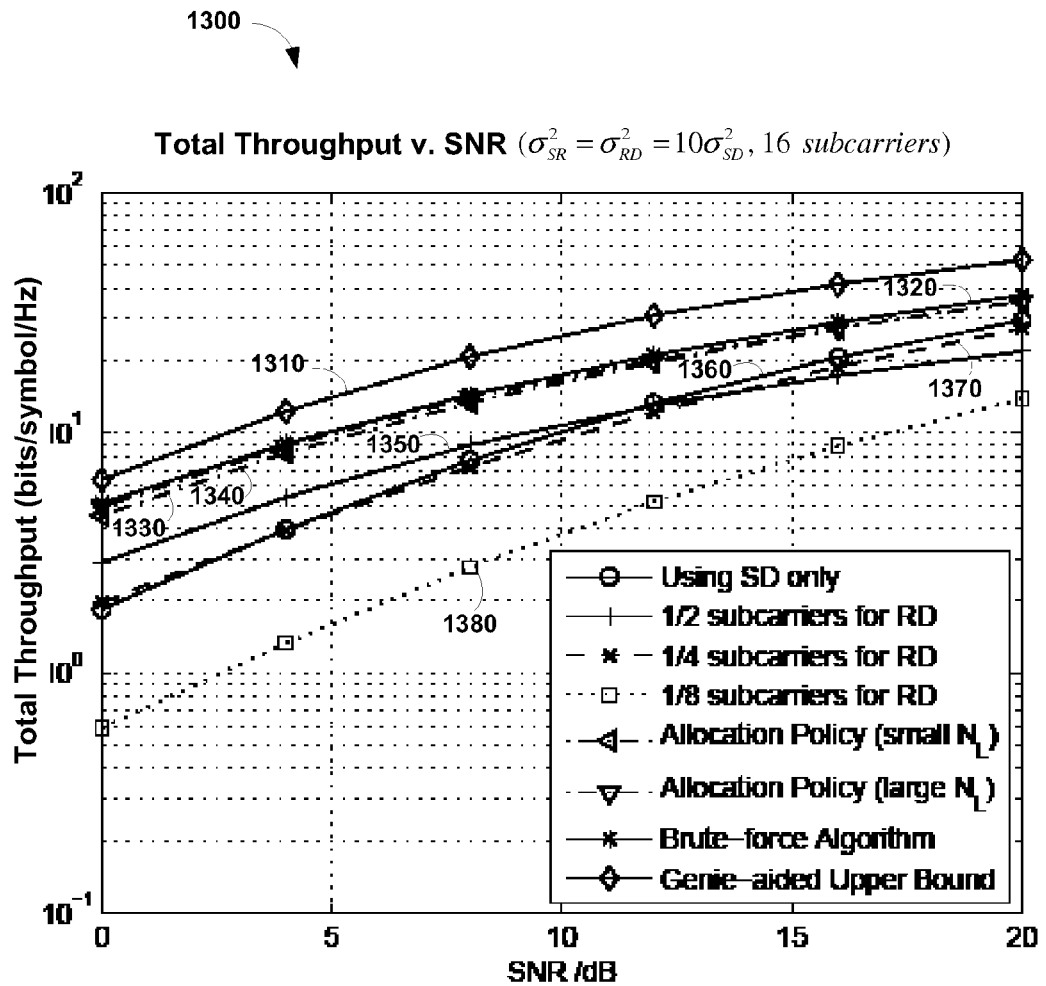

The efficacy of the above described embodiments can be verified by simulated results, as presented in non-limiting fashion in FIGS. 12 to 15. The throughput performance of the embodiments described herein can be compared with three baseline references, namely the baseline 1: point-to-point OFDM system without relay, the baseline 2: OFDMA relay system with a random subcarrier allocation as well as baseline 3: OFDMA relay system with a brute-force subcarrier allocation. In graph 1200, FIG. 12 shows the total throughput versus SNR with $\sigma_{SR}^2 = \sigma_{RD}^2 = 5\sigma_{SD}^2$. The selection algorithms of the embodiments herein for large $N_L$ 1230 and small $N_L$ 1240 perform better than baseline 1 (no relay) 1260 or baseline 2 (random selection) systems 1250, 1270 and 1280. The performance of the proposed scheme is also close to baseline 3 (brute-force) 1220 without the computational complexity. Curve 1210 represents the upper bound on total throughput. In graph 1300, FIG. 13 shows the case when $\sigma_{SR}^2 = \sigma_{RD}^2 = 10\sigma_{SD}^2$. Again, the selection algorithms of the embodiments herein for large $N_L$ 1330 and small $N_L$ 1340 perform better than baseline 1 (no relay) 1360 or baseline 2 (random selection) systems 1350, 1370 and 1380. The performance of the proposed scheme is also close to baseline 3 (brute-force) 1320 without the computational complexity. Curve 1310 represents the upper bound on total throughput.

The optimized subcarrier selection policies (both for large $N_L$ and small $N_L$) perform as well as the baseline 3 (brute-force) with negligible performance loss under all SNR conditions. In the low SNR regime, the selection policy for large $N_L$ 1330 performs slightly better than that for small $N_L$. In the high SNR regime, the system throughput of two policies are nearly the same. Since when SNR increases, $\lim_{SNR \to \infty} \lambda^T C^{SD}/E_H^{SR}[\lambda^T C^{SD}] = 1$, and as a result, the uncertainty of the SR link becomes less and less important. Equivalently speaking, in the high SNR regime, the statistics of the SR link provides enough information for the destination node to find the best allocation policy.

Figure 14:
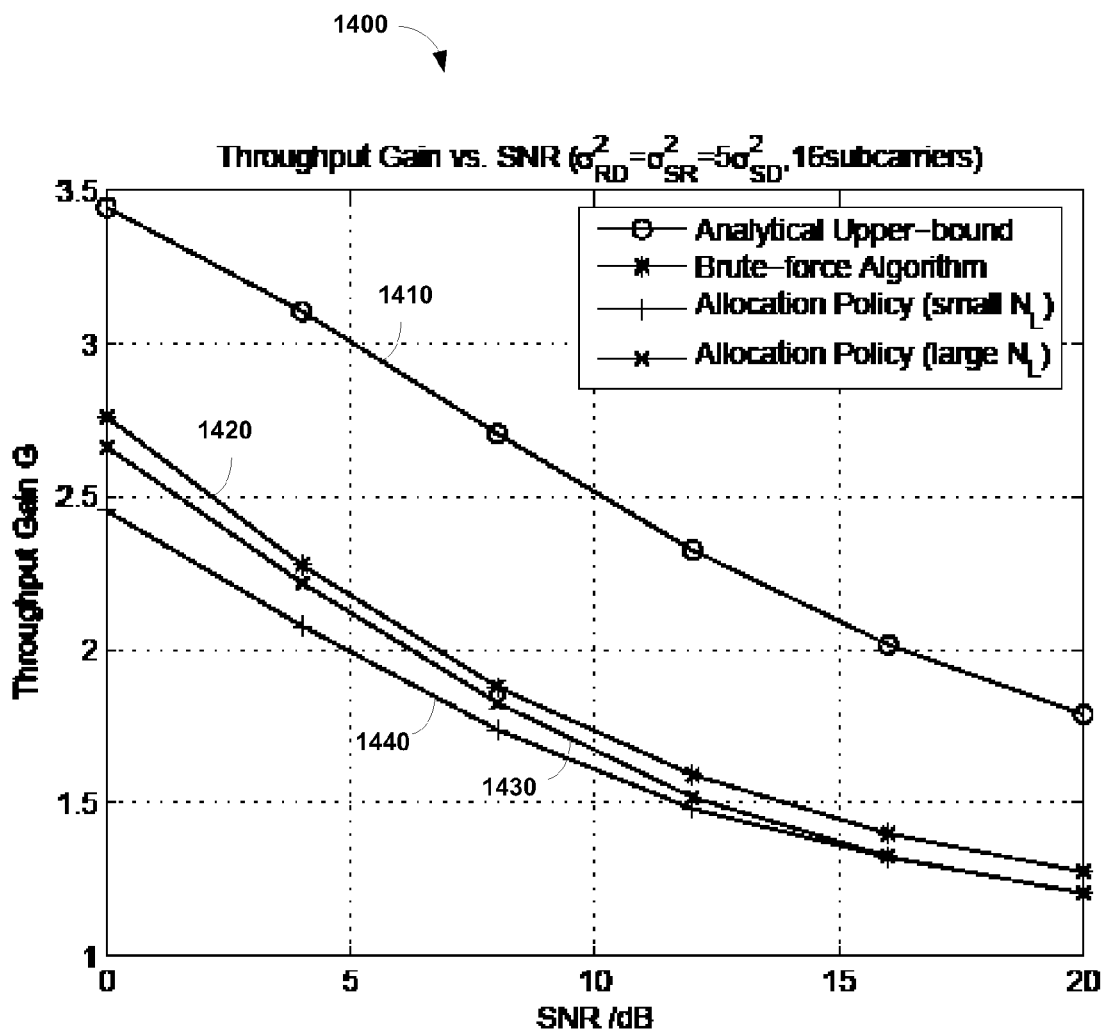
Figure 15:
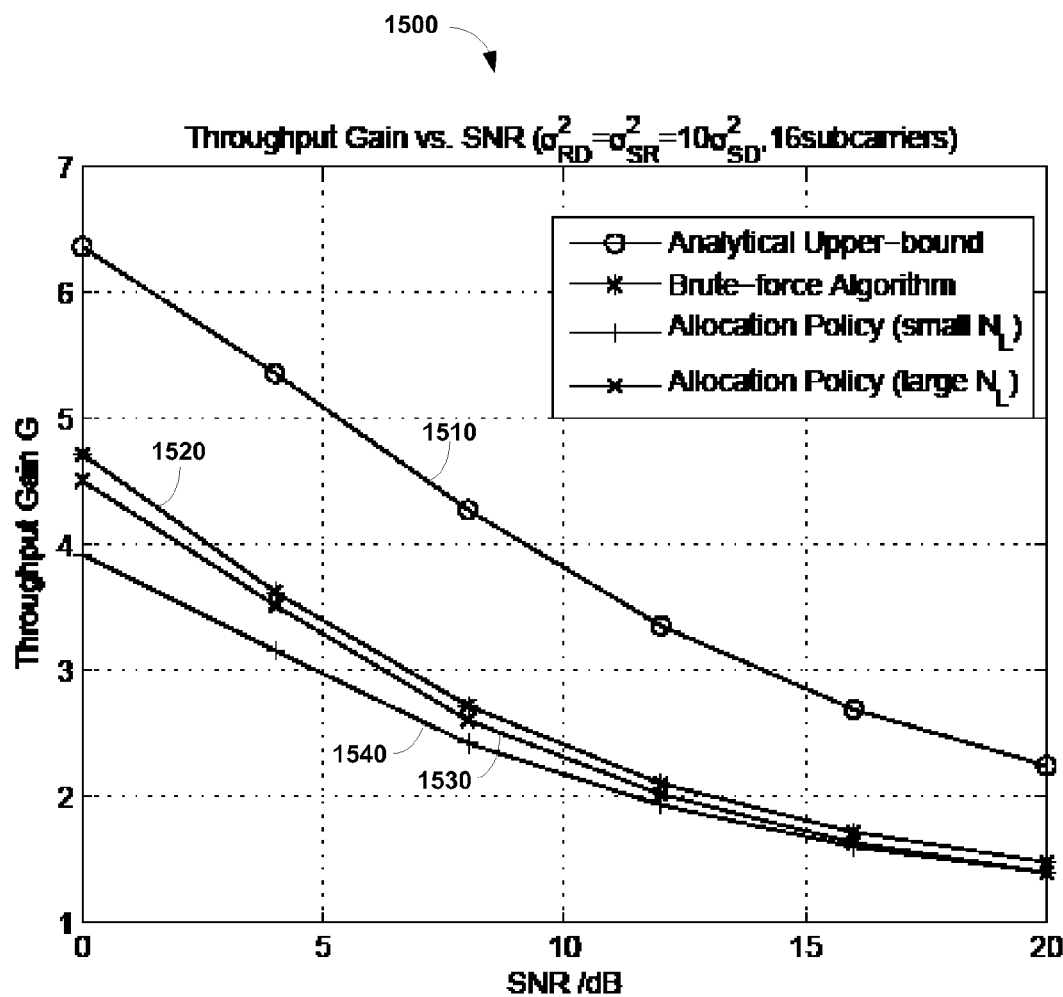

In graphs 1400 and 1500, FIGS. 14 and 15 respectively show the relationship between the system throughput gain G and SNR under different conditions ($\sigma_{SR}^2 = \sigma_{RD}^2 = 5\sigma_{SD}^2$ and $\sigma_{SR}^2 = \sigma_{RD}^2 = 10\sigma_{SD}^2$). The system throughput gain is thus decreasing with respect to SNR, as shown above. However, compared to the point-to-point OFDMA system without relay, the system throughput with the relay's help can be enhanced by more than 30% under a relatively high SNR (e.g., 20 dB). In FIG. 14, curve 1410 is the theoretical upper bound. Curve 1420 represents a brute force algorithm (high complexity), and curves 1430 and 1440 represent the dynamic allocation policy described herein for small $N_L$ and large $N_L$, respectively. Similarly, in FIG. 15, curve 1510 is the theoretical upper bound. Curve 1520 represents a brute force algorithm (high complexity), and curves 1530 and 1540 represent the dynamic allocation policy described herein for small $N_L$ and large $N_L$, respectively.

In brief sum, a rateless code was introduced with acknowledgements into OFDMA systems with half-duplex relay. By applying a simple transmission protocol, the subcarrier allocation problem was then formulated as an optimization problem. A distributed subcarrier allocation policy was then provided that utilizes locally available information at the destination node only and the asymptotic throughput performance was analyzed using the renewal process. Simulation results were then evaluated that show the total achievable rate of the selection algorithms described herein scales with the order of O(SNR) in the low SNR regime, and with the order of O(log SNR) in the high SNR regime, which is the same as the case without relay. The system throughput gain is bounded between 1 and $\Omega(\sigma_{SD}^2)/\Psi(\sigma_{SR}^2, \sigma_{RD}^2)$. The selection algorithms beneficially have low computational complexity with the order of O(N).

The resource allocation algorithms described herein thus have low complexity and a provable convergence property. In addition, asymptotic throughput performance shows that the system achieves significant throughput gain compared to the point-to-point baseline system without relay as well as the baseline system with random subcarrier allocation.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

Figure 16:
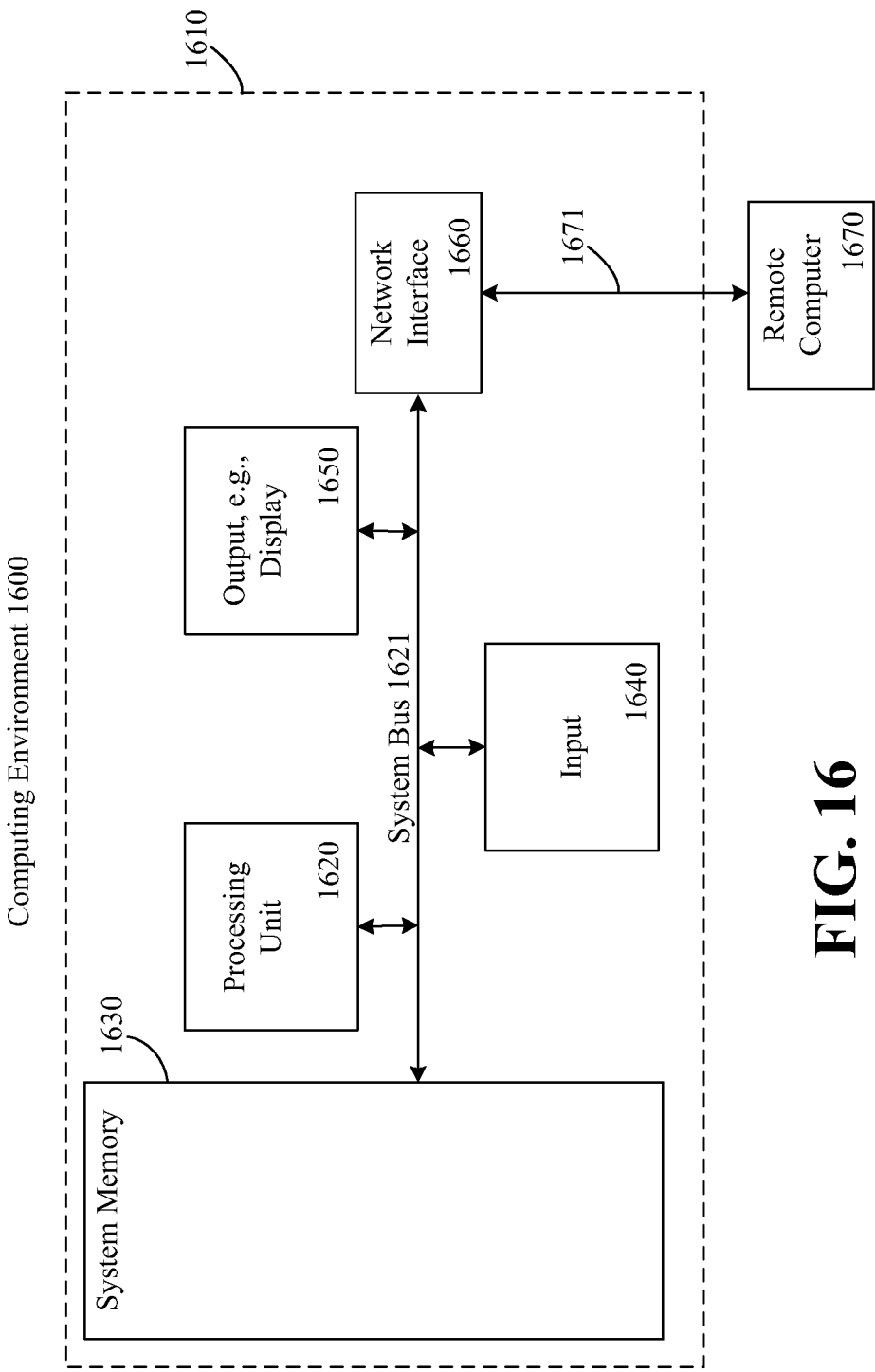
FIG. 16 is a block diagram of an example operating environment in which various aspects described herein can function.

FIG. 16 thus illustrates an example of a suitable computing system environment 1600 in which the claimed subject matter may be implemented, although as made clear above, the computing system environment 1600 is only one example of a suitable computing environment for a media device and is not intended to suggest any limitation as to the scope of use or functionality of the claimed subject matter. Further, the computing environment 1600 is not intended to suggest any dependency or requirement relating to the claimed subject matter and any one or combination of components illustrated in the example operating environment 1600.

With reference to FIG. 16, an example of a remote device for implementing various aspects described herein includes a general purpose computing device in the form of a computer 1610. Components of computer 1610 can include, but are not limited to, a processing unit 1620, a system memory 1630, and a system bus 1621 that couples various system components including the system memory to the processing unit

1620. The system bus 1621 can be any of several types of bus structures including a memory bus or memory controller, a peripheral bus, and a local bus using any of a variety of bus architectures.

Computer 1610 can include a variety of computer readable media. Computer readable media can be any available media that can be accessed by computer 1610. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1610. Communication media can embody computer readable instructions, data structures, program modules or other data in a modulated data signal such as a carrier wave or other transport mechanism and can include any suitable information delivery media.

The system memory 1630 can include computer storage media in the form of volatile and/or nonvolatile memory such as read only memory (ROM) and/or random access memory (RAM). A basic input/output system (BIOS), containing the basic routines that help to transfer information between elements within computer 1610, such as during start-up, can be stored in memory 1630. Memory 1630 can also contain data and/or program modules that are immediately accessible to and/or presently being operated on by processing unit 1620. By way of non-limiting example, memory 1630 can also include an operating system, application programs, other program modules, and program data.

The computer 1610 can also include other removable/non-removable, volatile/nonvolatile computer storage media. For example, computer 1610 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1621 through a non-removable memory interface such as an interface, and a magnetic disk drive or optical disk drive can be connected to the system bus 1621 by a removable memory interface, such as an interface.

A user can enter commands and information into the computer 1610 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1620 through user input 1640 and associated interface(s) that are coupled to the system bus 1621, but can be connected by other interface and bus structures, such as a parallel port, game port or a universal serial bus (USB). A graphics subsystem can also be connected to the system bus 1621. In addition, a monitor or other type of display device can be connected to the system bus 1621 via an interface, such as output interface 1650, which can in turn communicate with video memory. In addition to a monitor, computers can also include other peripheral output devices, such as speakers and/or a printer, which can also be connected through output interface 1650.

The computer 1610 can operate in a networked or distributed environment using logical connections to one or more other remote computers, such as remote computer 1670, which can in turn have media capabilities different from device 1610. The remote computer 1670 can be a personal computer, a server, a router, a network PC, a peer device or other common network node, and/or any other remote media consumption or transmission device, and can include any or all of the elements described above relative to the computer 1610. The logical connections depicted in FIG. 16 include a network 1671, such local area network (LAN) or a wide area network (WAN), but can also include other networks/buses. Such networking environments are commonplace in homes, offices, enterprise-wide computer networks, intranets and the Internet.

When used in a LAN networking environment, the computer 1610 is connected to the LAN 1671 through a network interface or adapter. When used in a WAN networking environment, the computer 1610 can include a communications component, such as a modem, or other means for establishing communications over the WAN, such as the Internet. A communications component, such as a modem, which can be internal or external, can be connected to the system bus 1621 via the user input interface at input 1640 and/or other appropriate mechanism. In a networked environment, program modules depicted relative to the computer 1610, or portions thereof, can be stored in a remote memory storage device. It should be appreciated that the network connections shown and described are exemplary and other means of establishing a communications link between the computers can be used.

Figure 17:
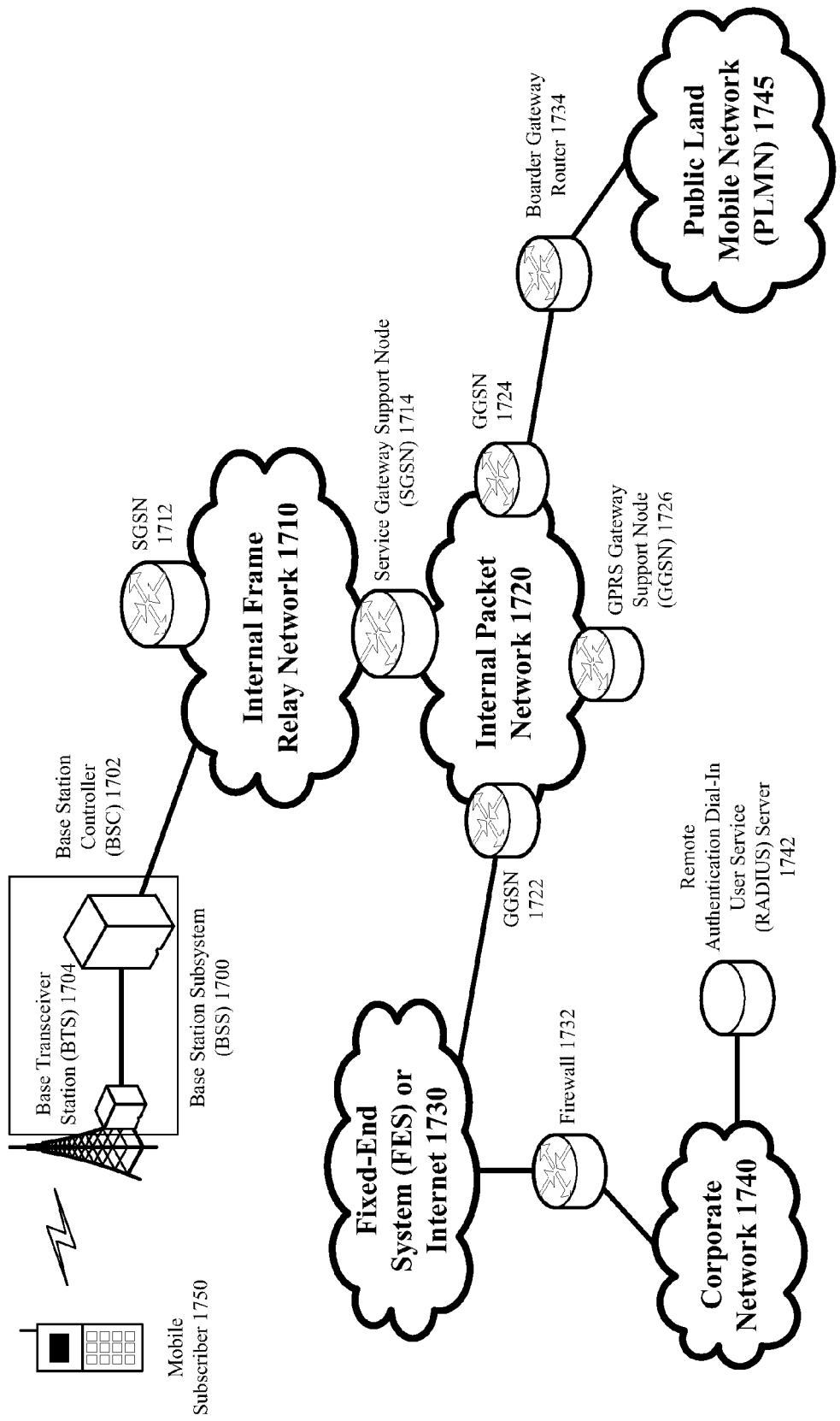
FIG. 17 illustrates an example wireless communication network in which various aspects described herein can be utilized.

Turning now to FIG. 17, an overview of a network environment in which the claimed subject matter can be implemented is illustrated. The above-described systems and methodologies for timing synchronization may be applied to any wireless communication network; however, the following description sets forth an exemplary, non-limiting operating environment for said systems and methodologies. The below-described operating environment should be considered non-exhaustive, and thus the below-described network architecture is merely an example of a network architecture into which the claimed subject matter can be incorporated. It is to be appreciated that the claimed subject matter can be incorporated into any now existing or future alternative architectures for communication networks as well.

FIG. 17 illustrates various aspects of the global system for mobile communication (GSM). GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1× Evolution Data Optimized ("EVDO"), Code Division Multiple Access-2000 ("cdma2000 3×"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 17 depicts an overall block diagram of an exemplary packet-based mobile cellular network environment, such as a GPRS network, in which the claimed subject matter can be practiced. Such an environment can include a plurality of Base Station Subsystems (B SS) 1700 (only one is shown), each of which can comprise a Base Station Controller (BSC) 1702 serving one or more Base Transceiver Stations (BTS) such as BTS 1704. BTS 1704 can serve as an access point where mobile subscriber devices 1750 become connected to the wireless network. In establishing a connection between a mobile subscriber device 1750 and a BTS 1704, one or more timing synchronization techniques as described supra can be utilized.

In one example, packet traffic originating from mobile subscriber 1750 is transported over the air interface to a BTS 1704, and from the BTS 1704 to the BSC 1702. Base station subsystems, such as BSS 1700, are a part of internal frame relay network 1710 that can include Service GPRS Support Nodes ("SGSN") such as SGSN 1712 and 1714. Each SGSN is in turn connected to an internal packet network 1720 through which a SGSN 1712, 1714, etc., can route data packets to and from a plurality of gateway GPRS support nodes (GGSN) 1722, 1724, 1726, etc. As illustrated, SGSN 1714 and GGSNs 1722, 1724, and 1726 are part of internal packet network 1720. Gateway GPRS serving nodes 1722, 1724 and 1726 can provide an interface to external Internet Protocol ("IP") networks such as Public Land Mobile Network ("PLMN") 1745, corporate intranets 1740, or Fixed-End System ("FES") or the public Internet 1730. As illustrated, subscriber corporate network 1740 can be connected to GGSN 1722 via firewall 1732; and PLMN 1745 can be connected to GGSN 1724 via boarder gateway router 1734. The Remote Authentication Dial-In User Service ("RADIUS") server 1742 may also be used for caller authentication when a user of a mobile subscriber device 1750 calls corporate network 1740.

Generally, there can be four different cell sizes in a GSM network—macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

APPENDIX A

Proof of Theorem I

Given an aggregate CSI $H=(H^{SD}, H^{RD}, H^{SD})$ in a fading block, the following three cases can happen.

$$I(x;y|x^1, H^{SD}, H^{SR}, H^{RD}, S) \geq I(x;y^1|x^1, H^{SD}, H^{SR}, H^{RD}, S) \qquad \text{Case 1)}$$

In this case, the destination can always decode before the relay. As a result, no relay is needed and the achievable rate is given by the mutual information between the transmitted symbols x at the source node and the received symbols y at the destination node, $I(x;y|x^1, H^{SD}, H^{SR}, H^{RD}, S) = \log\det(I + H^{SD}SQ(H^{SD}S)^H)$, where the Gaussian code is applied and $Q = SNR \cdot I$ since uniform power allocation is assumed. Recalling the definition of $S_A$ provided above, this expression can be further simplified into a scalar value, given by $\Sigma_{i \in S_A} \log(1 + |h_i^{SD}|^2 SNR)$, where $h_i^{SD}$ denotes the fading coefficient of i-th subcarrier in the SD link.

$$I(x;y|x^1, H^{SD}, H^{SR}, H^{RD}, S) < I(x;y^1|x^1, H^{SD}, H^{SR}, H^{RD}, S)$$
and $$I(x;y^1|x^1, H^{SD}, H^{SR}, H^{RD}, S) \le I(x, x^1; y^1|H^{SD}, H^{SR}, H^{RD}, S) \quad \text{Case 2)}$$

In this case, as shown in FIG. 10, the relay can help to decode and the bottleneck of the transmission becomes the SR link. Therefore, by the max-flow-min-cut theorem, the achievable rate is limited by the SR link. To be more specific, it is bounded by the mutual information between the transmitted symbols x and the received symbols $y^1$ at the relay node, $I(x;y^1|x^1, H^{SD}, H^{SR}, H^{RD}, S) = \log\det(I + H^{SR}SQ(H^{SR}S)^H)$. Following the same reasoning, the achievable rate can be expressed as $\Sigma_{i \in S_A} \log(1 + |h_i^{SR}|^2 SNR)$ and $h_i^{SR}$ corresponds to the fading coefficient of the i-th subcarrier in the SR link.

$$I(x;y|x^1, H^{SD}, H^{SR}, H^{RD}, S) < I(x;y^1|x^1, H^{SD}, H^{SR}, H^{RD}, S)$$
and $$I(x;y^1|x^1, H^{SD}, H^{SR}, H^{RD}, S) > I(x, x^1; y^1|H^{SD}, H^{SR}, H^{RD}, S)$$

In this case as shown in FIG. 11, the relay can help to decode and the bottleneck of the transmission is the source plus relay to the destination channel. If the stack size at the relay node d is allowed to be sufficiently large, the relay will always transmit. Therefore, the achievable rate is the mutual information received at the destination node (including the information transmitted from the source and the relay), $I(x, x^1; y|H^{SD}, H^{SR}, H^{RD}, S) = \log\det(I + H^{SD}SQ(H^{SD}S)^H) + \log\det(I + H^{RD}SQ(H^{RD}S)^H)$.

Applying the same procedure, the achievable rate can be expressed as:

$$\sum_{i \in S_A} \log(1 + |h_i^{SD}|^2 SNR) + \sum_{j \in S_A^C} \log(1 + |h_j^{RD}|^2 SNR),$$

where $h_i^{SD}$ and $h_j^{RD}$ denote the fading coefficients of i-th subcarrier in the SD link and j-th subcarrier in the RD link, respectively.

APPENDIX B

Proof of Lemma 1

From basic probability theory, $h(\lambda, H^{SD}, H^{RD})$ can be transformed as follows to Equation (29).

$$h(\lambda, H^{SD}, H^{RD}) = \lambda^T C^{SD} E_{H^{SR}}[I(\lambda^T C^{SD} \ge \lambda^T C^{SR})] + E_{H^{SR}}[\lambda^T C^{SR} I(\lambda^T C^{SD} < \lambda^T C^{SR} < \lambda^T C^{SD} + (1-\lambda)^T C^{RD})] + (\lambda^T C^{SD} + (1-\lambda)^T C^{RD}) E_{H^{SR}}[I(\lambda^T C^{SR} \ge \lambda^T C^{SD} + (1-\lambda)^T C^{RD})] = \lambda^T C^{SD} P_{\lambda^T C^{SR}}(\lambda^T C^{SD}) + E_{H^{SR}}[\lambda^T C^{SR} | \lambda^T C^{SD} > \lambda^T C^{SR} > \lambda^T C^{SD} + (1-\lambda)^T C^{RD}] + (\lambda^T C^{SD} + (1-\lambda)^T C^{RD})(1 - P_{\lambda^T C^{SR}}(\lambda^T C^{SD} + (1-\lambda)^T C^{RD}))$$

(29)

where $I(\cdot)$ denotes the indicator function and $P_x(\cdot)$ denotes the cumulative distribution function (c.d.f.) of the corresponding random variable x.

Let $y_i = \lambda_i C_i^{SR}$ and $y = \lambda^T C^{SR} = \Sigma_{i=1}^{n_F} y_i$. The p.d.f. of the random variable $y_i$ and its corresponding characteristic function are given by Equations (30) and (31):

$$p_{y_i}(y_i) = P'_{y_i}(y_i) \quad (30)$$
$$= P'_{y_i}(\lambda_i \log(1 + SNR|h_i^{SR}|^2) \le y_i)$$
$$= P'_{y_i}\left(|h_i^{SR}|^2 \le \frac{e^{\frac{y_i \ln 2}{\lambda_i}} - 1}{SNR}\right)$$
$$= \left(1 - e^{-\frac{e^{\frac{y_i \ln 2}{\lambda_i}} - 1}{\sigma_{SR}^2 SNR}}\right)'$$
$$= \frac{\ln 2}{\lambda_i} e^{\frac{1}{\sigma_{SR}^2 SNR}} e^{-e^{\frac{y_i \ln 2 - \lambda_i \ln(\sigma_{SR}^2 SNR)}{\lambda_i}} + \frac{y_i \ln 2 - \lambda_i \ln(\sigma_{SR}^2 SNR)}{\lambda_i}}$$

$$\Phi_i(\omega) = \int_{-\infty}^{\infty} p_{y_i}(y_i) e^{j\omega y_i} dy_i \quad (31)$$
$$= \Gamma\left(1 + j\omega \frac{\lambda_i}{\ln 2}\right) e^{j\omega \lambda_i \log_2(\sigma_{SR}^2 SNR)}$$

where $\sigma_{SR}^2$ is the variance of the random variable and $h_i^{SR}$ and $\Gamma(\cdot)$ denotes the Gamma Function. Because of the independency of the random variables $y_1, y_2, \ldots y_{n_F}$, the characteristic function of the random variable y is the product of each random variable $y_i$ and given by Equation (32):

$$\Phi(\omega) = \prod_{i=1}^{n_F} [\Phi_i(\omega)] = \prod_{i=1}^{n_F} \left[\Gamma\left(1 + j\omega \frac{\lambda_i}{\ln 2}\right) e^{j\omega \lambda_i \log_2(\sigma_{SR}^2 SNR)}\right] \quad (32)$$

To find the p.d.f. of the random variable y, the Inverse Fourier Transform of the characteristic function $\Phi(\omega)$ is taken to obtain Equation (33):

$$p_y(y) = F^{-1}[\Phi(\omega)] = \frac{1}{2\pi} \int_{-\infty}^{\infty} \Phi(\omega) e^{-j\omega y} d\omega \quad (33)$$

Thus, Equation (29) can be evaluated as:

$$h(\lambda, H^{SD}, H^{RD}) = \lambda^T C^{SD} \int_0^{\lambda^T C^{SD}} p_y(y) dy + \int_{\lambda^T C^{SD}}^{\lambda^T C^{SD} + (1-\lambda)^T C^{RD}} y p_y(y) dy + (\lambda^T C^{SD} + (1-\lambda)^T C^{RD}) \int_{\lambda^T C^{SD} + (1-\lambda)^T C^{RD}}^{\infty} p_y(y) dy \quad (34)$$

APPENDIX C

Proof of Lemma 2

Recall that a vector f is a subgradient of $g(\lambda)$ in $\lambda$, if for all $\lambda'$ $$g(\lambda') \ge g(\lambda) + f^T(\lambda' - \lambda). \quad (35)$$

By definition, $$g(\lambda) = \begin{cases} \lambda^T C^{SD}, & \text{for Case 1} \\ \lambda^T C^{SR}, & \text{for Case 2a} \\ \lambda^T (C^{SD} - C^{RD}) + 1^T C^{RD}, & \text{for Case 2b} \end{cases} \quad (36)$$

For case 1, $g(\lambda') = \lambda' C^{SD} = \lambda C^{SD} + (\lambda' - \lambda)^T C^{SD} \ge g(\lambda) + (C^{SD})^T(\lambda' - \lambda)$, thus verifying the definition of subgradient (35).

For case 2a, $g(\lambda') = \lambda' C^{SR} = \lambda C^{SR} + (\lambda' - \lambda)^T C^{SR} \ge g(\lambda) + (C^{SR})^T(\lambda' - \lambda)$, thus matching the definition of subgradient (35).

For case 2b, $g(\lambda')=\lambda'^{T}(C^{SD}-C^{RD})+1^{T}C^{RD}=\lambda^{T}(C^{SD}-C^{RD})+1^{T}C^{RD}+(\lambda'-\lambda)^{T}(C^{SD}-C^{RD})\geq g(\lambda)+(\lambda'-\lambda)^{T}(C^{SD}-C^{RD})$, thus satisfying the definition of subgradient (35).

Combining the three cases, Lemma 2 is demonstrated.

What is claimed is:

1. A device, comprising:
a memory that stores computer-executable components; and
a processor, communicatively coupled to the memory, that executes or facilitates execution of the computer-executable components, the computer-executable components including:
a wireless communications component configured to communicate with a source node via a first link and configured to communicate with a relay node via a second link; and
a decoder component configured to decode a current message that is transmitted by the source node to the wireless communications component and the relay node as a function of information provided by the relay node in response to a determination that the decoder component is not able to decode the current message before the relay node and that a different memory associated with the relay node is not at a defined level, and decode the current message without the information provided by the relay node in response to an acknowledgment message that indicates that the current message is decodable by the relay node and a determination that the decoder component is able to decode the current message before the relay node.

2. The device of claim 1, wherein the wireless communications component is configured to receive the acknowledgement message via the second link.

3. The device of claim 2, wherein the computer-executable components further comprise:
a subcarrier resource allocation component configured to allocate subcarrier resources in response to the determination that the different memory associated with the relay node is not at the defined level.

4. The device of claim 1, wherein the information provided by the relay node includes one or more symbols of the current message.

5. The device of claim 1, wherein the decoder component is configured to receive a re-encoded message from the relay node in response to the determination that the decoder component is not able to decode the current message before the relay node and that the different memory associated with the relay node is not at the defined level.

6. The device of claim 1, wherein the wireless communications component is configured to communicate with the source node and the relay node according to a transmission protocol based at least in part on rateless codes.

7. The device of claim 1, wherein a third link between the source node and the relay node is unavailable to the wireless communications component.

8. A method, comprising:
receiving, by a system including a processor, a current message from a source node according to a transmission protocol;
determining whether the current message is to be decoded, based at least in part on information provided by a relay node that also receives the current message from the source node, in response to receiving an acknowledgement message indicating that the current message is decodable by the relay node;
decoding the current message without the information provided by the relay node in response to the acknowledgment message indicting that the current message is decodable by the relay node and a determination that the current message is able to be decoded before the relay node; and
decoding the current message based on the information provided by the relay node in response to a determination that the current message is not able to be decoded before the relay node is able to decode the current message and that a memory associated with the relay node is not at a defined capacity.

9. The method of claim 8, further comprising:
transmitting a request message for the relay node to decode the current message in response to the determination that the current message is not able to be decoded before the relay node is able to decode the current message and that the memory associated with the relay node is not at the defined capacity.

10. The method of claim 9, wherein the decoding the current message based on the information provided by the relay node comprises receiving a re-encoded message from the relay node in response to the determination that the current message is not able to be decoded before the relay node is able to decode the current message and that the memory associated with the relay node is not at the defined capacity.

11. The method of claim 8, further comprising:
decoding the current message based on the information received from the relay node and other information received from the source node in response to the determination that the current message is not able to be decoded before the relay node is able to decode the current message and that the memory associated with the relay node is not at the defined capacity.

12. The method of claim 8, further comprising:
transmitting a different acknowledgment message to the source node in response to the decoding.

13. A system, comprising:
a destination node, including a processor and a memory, configured to receive a current message from a source node that was also directed to a relay node, to decode at least part of the current message without information provided by the relay node in response to reception of an acknowledgment message that indicates that the at least part of the current message is decodable by the relay node and a determination that the destination node is able to decode at least the part of the current message before the relay node, and to decode at least another part of the current message based at least in part on the information provided by the relay node in response to a determination that the destination node is not able to decode at least the other part of the current message before the relay node and that a memory associated with the relay node is not at a defined level.

14. The system of claim 13, wherein the destination node is configured to decode at least the part of the current message based on the information provided by the relay node in response to a determination that the destination node is not able to decode at least the part of the current message before the relay node and that the memory associated with the relay node is not at the defined level.

15. The system of claim 13, wherein the destination node transmits a different acknowledgment message to the source node in response to the determination that the destination node is able to decode at least the other part of the current message before the relay node.

16. The system of claim 13, wherein the destination node is configured to receive a re-encoded message in response to the determination that the destination node is not able to decode at least the other part of the current message before the relay node and that the memory associated with the relay node is not at the defined level.

17. The system of claim 16, wherein the destination node is configured to receive the re-encoded message from the relay node.

* * * * *